United States Patent
Jiang et al.

(10) Patent No.: US 10,673,528 B1
(45) Date of Patent: Jun. 2, 2020

(54) METHODS AND APPARATUSES FOR CONTROLLING OPTICAL SIGNALS IN OPTICAL NETWORKS

(71) Applicant: HUAWEI TECHNOLOGIES CO., LTD., Shenzhen, Guangdong (CN)

(72) Inventors: Zhiping Jiang, Kanata (CA); Chuandong Li, Ottawa (CA); Zhuhong Zhang, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/284,414

(22) Filed: Feb. 25, 2019

(51) Int. Cl.
| | |
|---|---|
| *H04B 10/2507* | (2013.01) |
| *H04B 10/50* | (2013.01) |
| *H04B 10/40* | (2013.01) |
| *H04B 10/60* | (2013.01) |
| *H04B 10/112* | (2013.01) |
| *H04B 10/116* | (2013.01) |
| *H04B 10/114* | (2013.01) |
| *H04B 10/11* | (2013.01) |

(52) U.S. Cl.
CPC ........ *H04B 10/25073* (2013.01); *H04B 10/11* (2013.01); *H04B 10/112* (2013.01); *H04B 10/114* (2013.01); *H04B 10/116* (2013.01); *H04B 10/1121* (2013.01); *H04B 10/1123* (2013.01); *H04B 10/1125* (2013.01); *H04B 10/1127* (2013.01); *H04B 10/1129* (2013.01); *H04B 10/1141* (2013.01); *H04B 10/1143* (2013.01); *H04B 10/1149* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | | | |
|---|---|---|---|---|
| 4,800,555 A | * | 1/1989 | Foschini | H04B 10/50 398/162 |
| 2011/0004802 A1 | * | 1/2011 | Bialkowski | H04L 1/0045 714/752 |
| 2015/0295821 A1 | * | 10/2015 | Huang | H04Q 11/0066 398/49 |
| 2018/0138980 A1 | * | 5/2018 | Jiang | H04B 10/572 |
| 2019/0166398 A1 | * | 5/2019 | Lee | H04H 60/00 |

* cited by examiner

*Primary Examiner* — Darren E Wolf
(74) *Attorney, Agent, or Firm* — BCF LLP

(57) ABSTRACT

The disclosed systems, apparatuses and methods are directed to controlling optical channel signal and an optical network equipment in optical networks. The methods comprise adjusting an optical channel spectrum based on bit error rates (BER) measured for a dithered optical channel signal. The optical channel spectrum is dithered such that a signal reference frequency is alternated between a first second signal reference frequency and a second signal reference frequency. BER is measured and analysed separately for the dithered signal reference frequency being detuned to the first and to the second signal reference frequencies. Based on a BER difference between BER at the first signal reference frequency and BER at the second signal reference frequency, the optical channel spectrum is shifted with regards to frequency in order to improve optical network performance.

22 Claims, 13 Drawing Sheets

METHODS AND APPARATUSES FOR CONTROLLING OPTICAL SIGNALS IN OPTICAL NETWORKS

CROSS-REFERENCE TO RELATED APPLICATIONS

This is the first application filed for the instantly disclosed technology.

FIELD OF THE INVENTION

The present invention generally relates to the field of optical networks and, in particular, to improving the performance of optical signals in optical networks.

BACKGROUND

Typical optical networks, such as, for example, dense wavelength division multiplex (DWDM) networks, transmit multiple optical channel signals. Each of these optical channel signals have to propagate through various optical network elements, such as, optical filters.

In order to fulfill current demands for increased capacities and higher data rate transmissions, signal baud rates need to be as high as possible. Higher baud rates may be achieved with narrower and more stable guard bands between the optical channel signals. However, optical network elements are susceptible to temperature changes, manufacturing defects, and other various factors that may result in relative frequency offsets between the transmittances of optical network elements and the spectrum of a transmitted optical channel signal. Examples of such relative frequency offsets include relative frequency offsets between optical filter transmittance and the optical channel spectrum of the transmitted optical channel signal. These relative frequency offsets may alter the guard bands between the optical channel signals and reduce the baud rate, thereby compromising the throughput performance of the optical network.

SUMMARY

An object of the present disclosure is to provide a technique for controlling optical channel signal in order to improve performance of an optical network. The apparatuses, methods and systems as disclosed herein permit reducing the relative frequency offset between optical filter transmittance and an optical channel spectrum of a transmitted optical channel signal in order to improve optical network performance.

In accordance with this objective, various aspects of the present disclosure provide methods, systems and apparatuses for transmitting and receiving an optical channel signal that is dithered with regards to frequency, and for controlling optical signal by adjusting the optical network equipment based on measured bit error rates.

Based on measured bit error rates, a receiver is configured to determine whether the optical channel spectrum needs to be adjusted. The optical channel spectrum may be shifted with regards to frequency by shifting towards higher or lower frequencies. An original signal reference frequency may be requested to be increased or decreased in order to reduce the relative frequency offset. A transmitter is instructed to either increase the original signal reference frequency of the optical channel signal or to decrease the original signal reference frequency.

At the same time, or alternatively, an optical filter may be instructed to shift an optical filter transmittance by increasing or decreasing the filter reference frequency in order to reduce the relative frequency offset.

In accordance with this objective, an aspect of the present disclosure provides a method for controlling an optical channel signal in an optical network, the optical channel signal having an optical channel spectrum and an original signal reference frequency. The method comprises transmitting a dithered optical channel signal obtained by alternately detuning of the optical channel spectrum with regards to frequency, a dithered signal reference frequency of the dithered optical channel signal being detuned to a first signal reference frequency during first time periods and to a second signal reference frequency during second time periods, the first signal reference frequency being lower than the second signal reference frequency. The method further comprises receiving a request to shift the optical channel spectrum of the optical channel signal with regards to frequency, the request comprising an indication of a direction of shifting of the optical channel spectrum with regards to frequency; and shifting the optical channel spectrum with regards to frequency based on the received request.

The request to shift the optical channel spectrum of the optical channel signal may comprise a request to increase the original signal reference frequency of the optical channel spectrum or a request to decrease the original signal reference frequency of the optical channel spectrum. The detuning of the optical channel spectrum with regards to frequency may be performed digitally by a digital signal processor or by detuning of a laser light source. The detuning of the optical channel spectrum with regards to frequency may be performed digitally by a digital signal processor and shifting the optical channel spectrum with regards to frequency based on the received request may be performed by a laser light source. The request to shift the optical channel spectrum may further comprise a frequency adjustment step.

The method may further comprise receiving a request to adjust the optical channel spectrum of the optical channel signal based on a bit error rate difference between a second bit error rate and a first bit error rate. The first bit error rate may be measured and averaged during the first time periods, and the second bit error rate may be measured and averaged during the second time periods. The method further comprises adjusting the optical channel spectrum of the optical channel signal based on the received request.

The request to adjust the optical channel spectrum of the optical channel signal may comprise a request to increase an original signal reference frequency of the optical channel spectrum or a request to decrease the original signal reference frequency of the optical channel spectrum. The request to increase the original signal reference frequency may be received in response to the bit error rate difference being negative, and the request to decrease the original signal reference frequency may be received in response to the bit error rate difference being positive. The request to adjust the optical channel spectrum may further comprise a frequency adjustment step. The first time periods and the second time periods may be repeated during a monitoring time period.

The optical channel signal may be a first carrier of a dual-carrier optical signal, the dual-carrier optical signal comprising the first carrier and a second carrier. The second carrier may have a second optical channel spectrum and a second original signal reference frequency. The method may further comprise: transmitting a second dithered carrier obtained from the second carrier by alternately detuning of the second optical channel spectrum with regards to frequency, the second dithered optical channel spectrum having a second dithered signal reference frequency being detuned to: a third signal reference frequency during third time periods, and a fourth signal reference frequency during fourth time periods; receiving a request to shift the second optical channel spectrum of the second carrier with regards to frequency, the request comprising an indication of a direction of shifting of the second optical channel spectrum with regards to frequency; and shifting the second optical channel spectrum of the second carrier with regards to frequency based on the received request. The third signal reference frequency may be lower than the second original signal reference frequency. The fourth signal reference frequency may be higher than the second original signal reference frequency. The fourth signal reference frequency may be higher than the third signal reference frequency.

A first dithering period of the first carrier may be different from a second dithering period of the second carrier. The first carrier and the second carrier may be dithered orthogonally.

In accordance with other aspects of the present disclosure, there is provided an apparatus for optical networks. The apparatus comprises a laser light source configured to generate an optical channel signal having an optical channel spectrum; and a processor. The processor is configured to dither optical channel spectrum with regards to frequency. The dithered optical channel signal has a dithered optical channel spectrum. A dithered signal reference frequency is detuned to: a first signal reference frequency during first time periods, and a second signal reference frequency during second time periods, the second signal reference frequency being higher than the first signal reference frequency. The processor is also configured to receive an indication of a direction of shifting of the optical channel spectrum with regards to frequency; shift, by a frequency adjustment step, the optical channel spectrum with regards to frequency based on the indication.

In accordance with additional aspects of the present disclosure, there is provided a method for controlling an optical network equipment in the optical network. The method comprises receiving a dithered optical channel signal. The dithered optical channel signal may be obtained from an optical channel signal by dithering an optical channel spectrum with regards to frequency. The dithered optical channel signal has a dithered signal reference frequency that is detuned to: a first signal reference frequency during first time periods, and a second signal reference frequency during second time periods, the second signal reference frequency being higher than the first signal reference frequency. The method further comprises measuring and averaging a first bit error rate of the dithered optical channel signal during the first time periods and measuring and averaging a second bit error rate of the dithered optical channel signal during the second time periods. The method further comprises transmitting a request to the optical network equipment to adjust operation of the optical network equipment based on a bit error rate difference between the second bit error rate and the first bit error rate.

The optical network equipment may be a transmitter. The request to adjust operation of the optical network equipment may further comprise a request to adjust the optical channel spectrum of the optical channel signal. The request to adjust operation may comprise an indication based on the bit error rate difference being positive or negative. The request to adjust operation of the optical network equipment may comprise a request to increase an original signal reference frequency, and the request to increase the original signal reference frequency may be transmitted in response to the bit error rate difference being negative. The request to adjust operation of the optical network equipment may comprise a request to decrease the original signal reference frequency, and the request to decrease the original signal reference frequency may be transmitted in response to the bit error rate difference being positive.

The dithered optical channel signal may be a first dithered carrier of a dual-carrier optical signal and the bit error rate difference may be a first carrier bit error rate difference. The dual-carrier optical signal may comprise the first dithered carrier and a second dithered carrier. The second dithered carrier may be dithered with regards to frequency. The second dithered carrier may have a second dithered signal reference frequency detuned to a third signal reference frequency during third time periods and a fourth signal reference frequency during fourth time periods.

The request to adjust the optical channel spectrum of the optical channel signal may be further based on a second bit error rate difference between a fourth bit error rate and a third bit error rate. The third bit error rate may be measured and averaged when the second dithered carrier reference frequency is detuned to the third signal reference frequency, and the fourth bit error rate may be measured and averaged when the second dithered carrier reference frequency is detuned to the fourth signal reference frequency.

The method may further comprise: measuring and averaging a third bit error rate of the dithered optical channel signal during the third time periods and a fourth bit error rate of the dithered optical channel signal during the fourth time periods; and transmitting a request to the optical network equipment to adjust operation of the optical network equipment. The request to adjust operation of the optical network equipment may be based on the first carrier bit error rate difference; a second carrier bit error rate difference between the fourth bit error rate and the third bit error rate; and a difference between the third bit error rate and the first bit error rate. The first dithered carrier and the second dithered carrier may be dithered orthogonally.

The dithered optical channel signal may be received after propagating through an optical filter. The optical network equipment may be the optical filter, and the request to adjust operation of the optical network equipment may further comprise a request to shift an optical filter transmittance of the optical filter by increasing or decreasing an optical filter reference frequency. The request to adjust operation of the optical network equipment may be based on the bit error rate difference being positive or negative. The request to adjust operation of the optical network equipment may comprise an indication of the bit error rate being positive or negative. In accordance with other aspects of the present disclosure, there is provided another apparatus for optical networks. The apparatus comprises: a photodetector configured to receive a dithered optical channel signal, and a processor. The dithered optical channel signal has a dithered signal reference frequency being detuned to: a first signal reference frequency during first time periods, and a second signal reference frequency during second time periods, the second signal reference frequency being higher than the first signal reference frequency. The processor is configured to: determine an averaged first bit error rate during the first time periods and an averaged second bit error rate during the second time periods; and generate and transmit a request to optical network equipment to adjust operation of the optical network equipment based on a bit error rate difference between the second bit error rate and the first bit error rate.

The optical network equipment may be a transmitter. The request to adjust operation of the optical network equipment may comprise a request to adjust an optical channel spectrum of the optical channel signal. The request to adjust an optical channel spectrum of the optical channel signal may be based on the bit error rate difference being positive or negative. The request to adjust the optical channel spectrum may comprise a request to increase an original signal reference frequency of the optical channel spectrum or a request to decrease the original signal reference frequency of the optical channel spectrum. The request to increase the original signal reference frequency may be generated in response to the bit error rate difference being negative. The request to decrease the original signal reference frequency may be generated in response to the bit error rate difference being positive. The request to adjust the optical channel spectrum may comprise an indication of the bit error rate difference being positive or negative. The request to adjust the optical channel spectrum may comprise an indication of a direction of a shift of the optical channel spectrum with regards to frequency.

The optical network equipment may be an optical filter, and the request to adjust operation may comprise a request to shift an optical filter transmittance with regards to a frequency by increasing or decreasing of optical filter reference frequency. The request to adjust operation of the optical network equipment may be based on the bit error rate difference being positive or negative. The optical channel signal may be a first carrier of a dual-carrier optical signal, the dithered optical channel signal may be the first dithered carrier, and the bit error rate difference may be the first carrier bit error rate difference. The photodetector may be further configured to receive the first dithered carrier and a second dithered carrier, the second dithered carrier may have a dithered signal reference frequency that is detuned to a third signal reference frequency during third time periods and a fourth signal reference frequency during fourth time periods, the fourth signal reference frequency being higher than the third signal reference frequency. The processor may be further configured to: determine an averaged third bit error rate during the third time periods and an averaged fourth bit error rate during the fourth time periods; and generate and transmit a request to the optical network equipment to adjust operation of the optical network equipment based on: the first carrier bit error rate difference; a second carrier bit error rate difference between the fourth bit error rate and the third bit error rate; and a difference between the third bit error rate and the first bit error rate.

In accordance with additional aspects of the present disclosure, there is provided a method for controlling an optical channel signal in an optical network, the optical channel signal having an optical channel spectrum and an original signal reference frequency. The method comprises transmitting a dithered optical channel signal obtained by detuning of the optical channel spectrum with regards to frequency, the dithered optical channel signal having a dithered signal reference frequency being detuned to: a first signal reference frequency during first time periods, the first signal reference frequency being lower than the original signal reference frequency, and a second signal reference frequency during second time periods, the second signal reference frequency being higher than the original signal reference frequency. The method further comprises receiving a request to shift the optical channel spectrum of the optical channel signal with regards to frequency, the request comprising an indication of a direction of shifting of the optical channel spectrum with regards to frequency; and shifting the optical channel spectrum with regards to frequency based on the received request.

BRIEF DESCRIPTION OF THE FIGURES

The features and advantages of the present disclosure will become apparent from the following detailed description, taken in combination with the appended drawings, in which.

Figure 1:
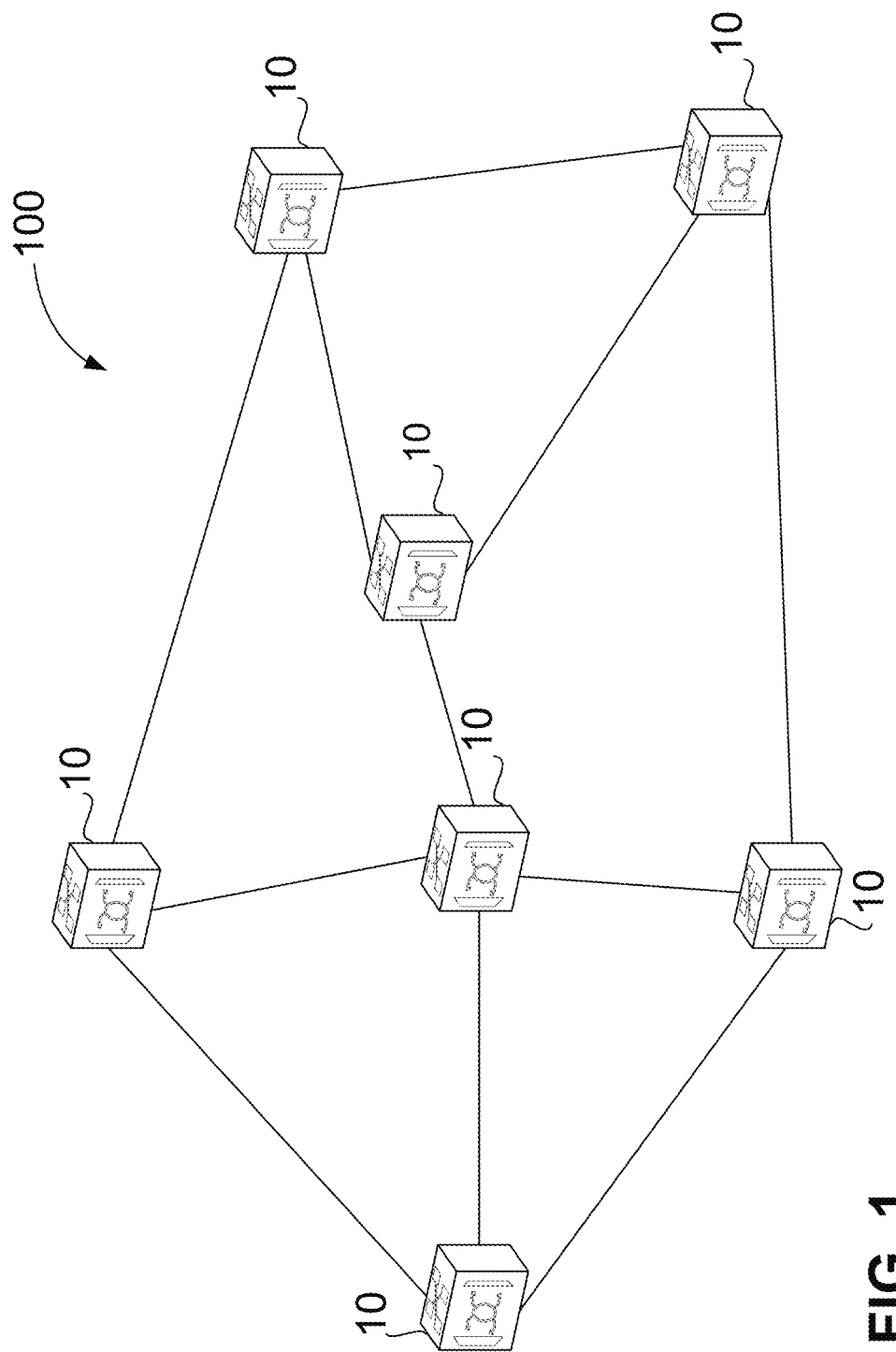
FIG. 1 (Prior Art) depicts a block diagram of an optical network.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

The instant disclosure is directed to systems, methods and apparatuses to address the deficiencies of the current state of the art. To this end, the instant disclosure describes systems, apparatuses and methods directed to reducing relative frequency offset between an optical channel spectrum and an optical filter transmittance, allowing for higher signal baud rate, and therefore improving throughput performance of the optical network.

As used herein, the term "about" or "approximately" refers to a +/−10% variation from the nominal value. It is to be understood that such a variation is always included in a given value provided herein, whether or not it is specifically referred to.

The optical network equipment, as referred to herein, comprises one or more passive and/or active optical network components and/or modules of an optical network, including, but not limited to, optical fiber, optical amplifiers, optical filters, WSSs, optical links, arrayed waveguide gratings, laser light sources, transmitters and receivers.

Throughout the present disclosure, the term "optical channel signal" refers to modulated optical signals at particular carrier frequencies, that is a signal that is carried in an optical link. Similarly, the term "transmitted optical channel signal" refers to an optical channel signal that is transmitted into the optical link by an optical transmitter. The term "received optical channel signal" refers to an optical channel signal, after having been propagated through the optical link, as received by an optical receiver.

In addition, a signal reference frequency, as disclosed below, refers to a signal carrier frequency, a signal central frequency and/or a frequency of a maximum of optical channel spectrum, which may coincide or may be different from each other. It should be understood that when an optical channel spectrum is shifted with regard to frequency locations, the signal reference frequency commensurately shifts. Furthermore, a filter reference frequency, as disclosed below, refers to an optical filter central frequency and/or a frequency of optical filter transmittance' maximum (peak), which may coincide or may be different from each other. It should be understood that when an optical filter transmittance is shifted with regards to frequencies, the filter reference frequency shifts with regards to frequencies.

Unless otherwise defined, all technical and scientific terms used herein have the same meaning as commonly understood by one of ordinary skill in the art to which the described embodiments appertain.

Referring now to the drawings, FIG. 1 (Prior Art) depicts a block diagram of a representative optical network 100. Generally, optical network 100 comprises multiple nodes/elements, in which each node may include an optical add-drop multiplexer, such as, for example, a reconfigurable optical add-drop multiplexer (ROADM) 10. ROADM 10 may include at least one wavelength selective switch (WSS). The optical network 100 may also include one or more laser light sources as well as amplification nodes (which have been omitted for simplicity).

Optical network 100 is generally designed to transmit a plurality of optical channel signals, in which each optical channel signal is characterized by a channel bandwidth and a signal central frequency, in accordance with frequency grid guidelines, such as, for example, the International Telecommunication Union Telecommunication Standardization Sector (ITU-T) frequency grid.

Each optical channel signal has an optical channel spectrum. Channel central frequencies of two neighbouring optical channel signals are separated by a frequency spacing. A guard band separating the two neighbouring optical channel signals is defined by the optical channel spectra.

Returning back to FIG. 1, ROADMs 10 may comprise one or more optical filters. By way of a non-limiting example, the WSS of ROADMs 10 may act as an optical filter for the optical channel signals routed by the WSS. Each of these optical filters may be characterized by an optical filter transmittance and a filter bandwidth.

Figure 2:
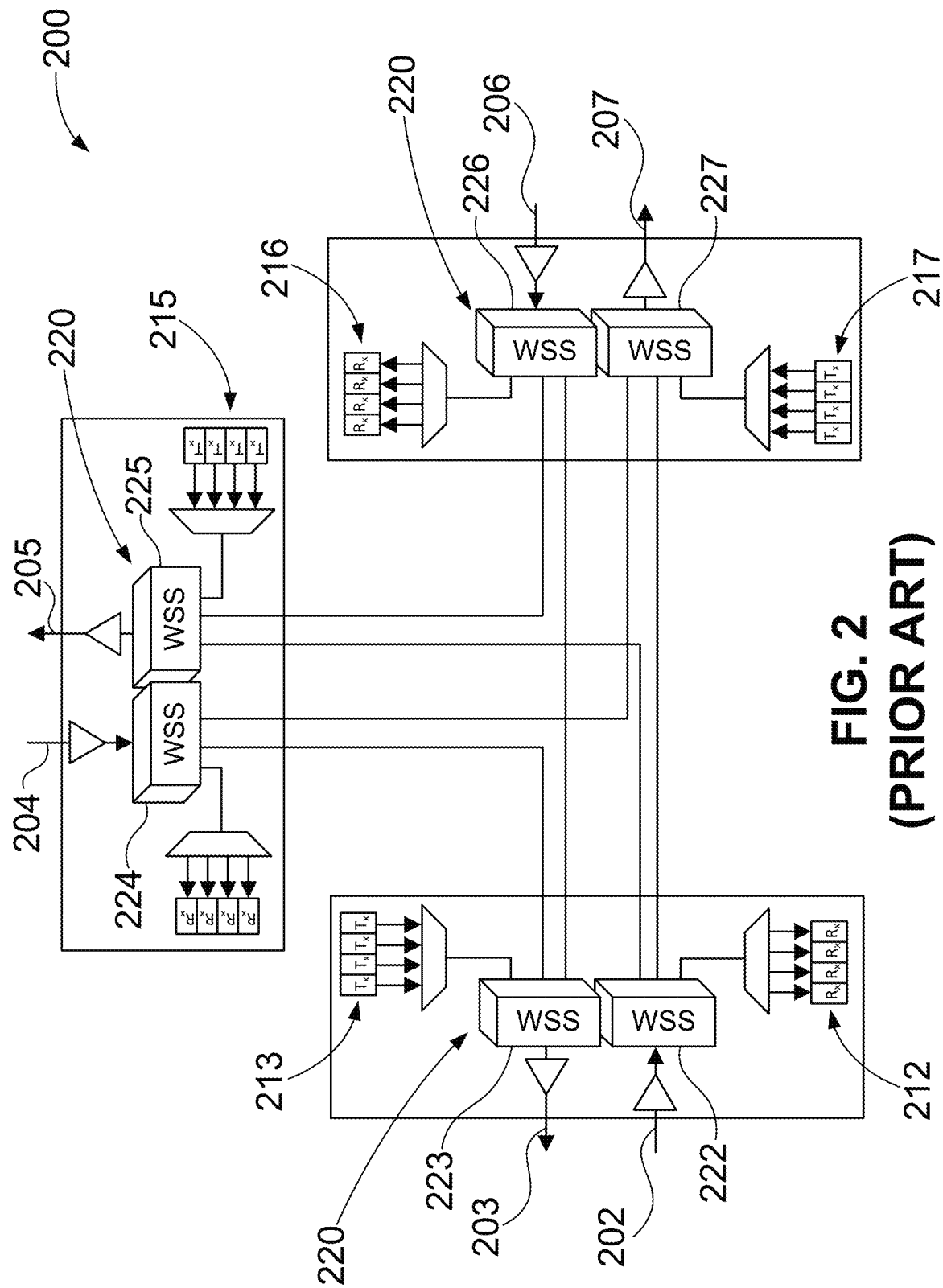
FIG. 2 (Prior Art) depicts a block diagram of a three-degree reconfigurable optical add-drop multiplexer node.

FIG. 2 depicts a block diagram of a three-degree ROADM node 200. ROADM node 200 comprises WSSs 222, 223, 224, 225, 226, 227 (also referred to herein collectively as WSS 220), receivers Rx 212, 214, 216, and transmitters Tx 213, 215, 217. The transmitters 213, 215, 217 may include, for example, laser light sources (not shown).

The ROADM node 200 is configured to receive one or more DWDM signals 202, 204, 206 having a plurality of optical channel signals. One or more optical channel signals may be dropped from DWDM signals 202, 204, 206 at receivers 212, 214, 216. WSS 220 may act as an optical filter in order to select one or more optical channel signals from DWDM signals 202, 204, 206. ROADM node 200 may be also configured to add one or more optical channel signals generated by transmitters 213, 215, 217, as well as allow the passing through of optical channel signals. WSS 220, acting as an optical filter, may also filter the optical channel signals after they have been generated by transmitters 213, 215, 217.

Dropped optical channel signals may be converted from the optical domain to the electrical domain, and added optical channel signals may be converted from the electrical domain to the optical domain. Otherwise, optical channel signals are switched or passed through in the optical domain.

As noted above, optical channel signals and signal reference frequencies are generally defined by frequency grid guidelines, such as, for example, the ITU-T frequency grid specifications. However, various factors, such as changes in temperature, manufacturing errors, and/or transmitter control errors may result in the detuning of the optical channel spectra as well as the detuning of signal frequencies, emitted by transmitters 213, 215, 217, from ITU-T grid frequencies.

Furthermore, temperature changes, manufacturing errors and/or control errors may also compromise performance of optical filters. These factors may also result in the detuning of the optical filter transmittances and detuning of filter frequencies from ITU-T grid frequencies.

It will be appreciated that the detuning of the optical channel spectrum and/or the optical filter transmittance may result in the relative frequency offsets. These relative frequency offsets may occur due to optical filters and/or the transmitters that emit optical channel signals. For example, the accuracy of a laser central frequency (or of a laser peak frequency) of a laser light source used in transmitters 213, 215, 217 is usually specified with precision of +/−2.5 GHz. A filter central frequency of WSSs 220 is also specified with precision of +/−2.5 GHz. However, the laser central frequency and the filter central frequency may both be detuned (i.e., drift) in different frequency directions. In other words, the laser central frequency may increase while the filter central frequency may decrease, or vice-versa. These detuning issues may result in at least a few-GHz relative frequency offsets between the signal central frequency and the filter central frequency.

Such relative frequency offset may cause significant impairment to the performance of the optical network. As noted above, the relative frequency offset may require larger guard bands between the optical channel signals which, in turn, results in lower signal baud rates. In prior art optical networks, additional guard bands may be implemented to account for the unwanted effects of relative frequency offsets. However, the use of such guard bands results in the inefficient use of spectral bandwidth, as the bandwidth allocated to the guard bands cannot be used for data transmission.

The disclosed embodiments provide methods and systems directed to implementations configured to mitigate relative frequency offsets that may occur between the optical channel spectrum and the optical filter transmittance during optical signal transmission.

It should be understood that the relative frequency offset between the optical channel spectrum and the optical filter transmittance corresponds to the relative frequency offset between the signal reference frequency and the filter reference frequency. Both are referred to herein as the relative frequency offset.

It should also be understood that, although reference frequencies and the relative frequency offset are discussed herein, the inventive concepts as discussed herein may be equally applied to central wavelengths and relative wavelength offset, by using frequency to wavelength conversion known in the art.

Figure 3:
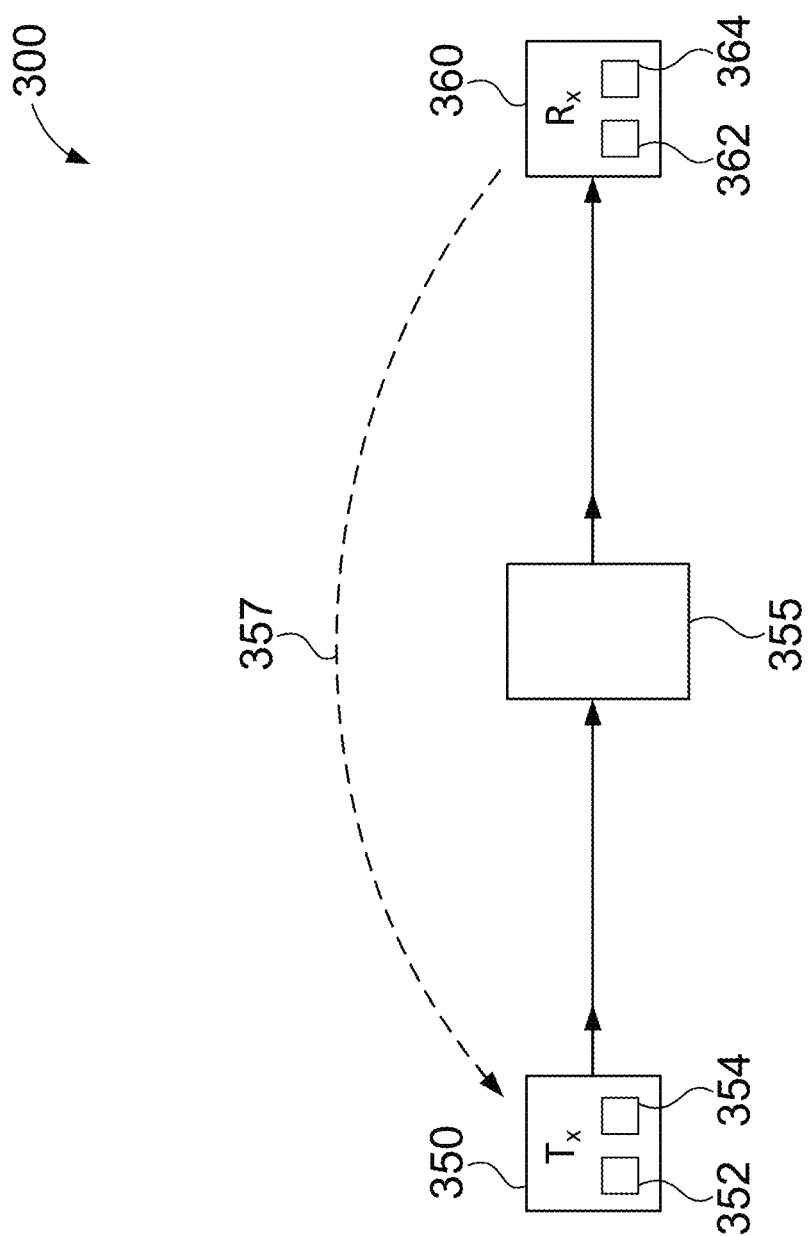
FIG. 3 depicts an optical link, in accordance with various embodiments of the present disclosure.

FIG. 3 depicts an optical link 300 having a transmitter 350 and a receiver 360, in accordance with embodiments of the present disclosure, as described herein. As, shown, the transmitted optical channel signal is generated by transmitter 350. The received optical channel signal, after having propagated through an optical filter 355, is received at receiver 360, which in some embodiments may be a coherent receiver.

The transmitter 350 may have a laser light source 352 configured to emit an optical channel signal, and a processor such as a digital signal processor (DSP) 354. The receiver 360 may have a photodetector 362 configured to receive the optical channel signal, and a receiver processor 364. Transmitter 350 and receiver 360 may also have other components such as, for example, digital-to-analog converters (DAC), drivers, and electro-optic (EO) modulators, not depicted in FIG. 3.

Figure 4:
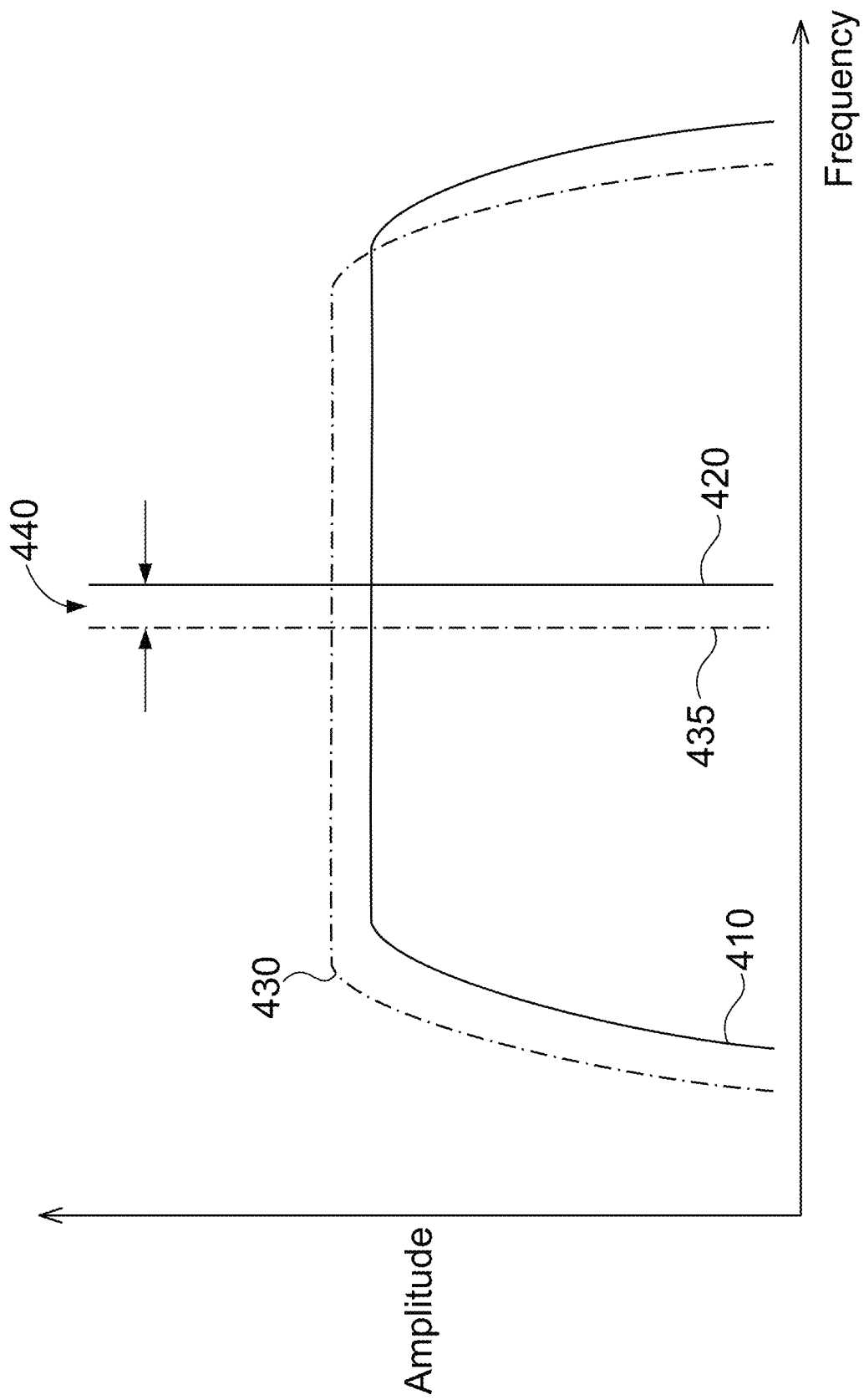
FIG. 4 illustrates a relative frequency offset, in accordance with various embodiments of the present disclosure.

FIG. 4 illustrates a relative frequency offset 440, in accordance with various embodiments of the present disclosure. FIG. 4 depicts an optical channel spectrum 410 of the transmitted optical channel signal transmitted by transmitter 350, and an optical filter transmittance 430 of optical filter 355. The optical channel spectrum 410 and optical filter transmittance 430 are detuned from each other by relative frequency offset 440. FIG. 4 also illustrates a signal reference frequency 420 of the optical channel signal and filter reference frequency 435. In the illustrated embodiment, signal reference frequency 420 is a signal central frequency, and filter reference frequency 435 is a filter central frequency. It should be noted that amplitudes of optical channel spectrum 410 and of optical filter transmittance 430 are provided in FIG. 4 for illustration purposes only.

Asymmetric filtering occurs when optical channel spectrum 410 is shifted compared to optical filter transmittance 430. The amount by which the spectrum 410 and transmittance 430 are offset is referred to as the relative frequency offset 440 (also referred to herein as a frequency offset 440). Such asymmetric filtering may result in a higher penalty compared to transmission without the asymmetric filtering, such as, for example, when the frequency offset 440 is zero. In exemplary FIG. 4, the width of optical channel spectrum 410 is approximately the same as the width of optical filter transmittance 430. Accordingly, the relative frequency offset 440 may cause impairment of the signal transmission in the optical network. Therefore, relative frequency offset 440 needs to be reduced.

In the embodiments presented by the instant disclosures, a receiver, such as receiver 360, can be configured to measure bit error rates (BERs) of the received optical channel signals.

Figure 5:
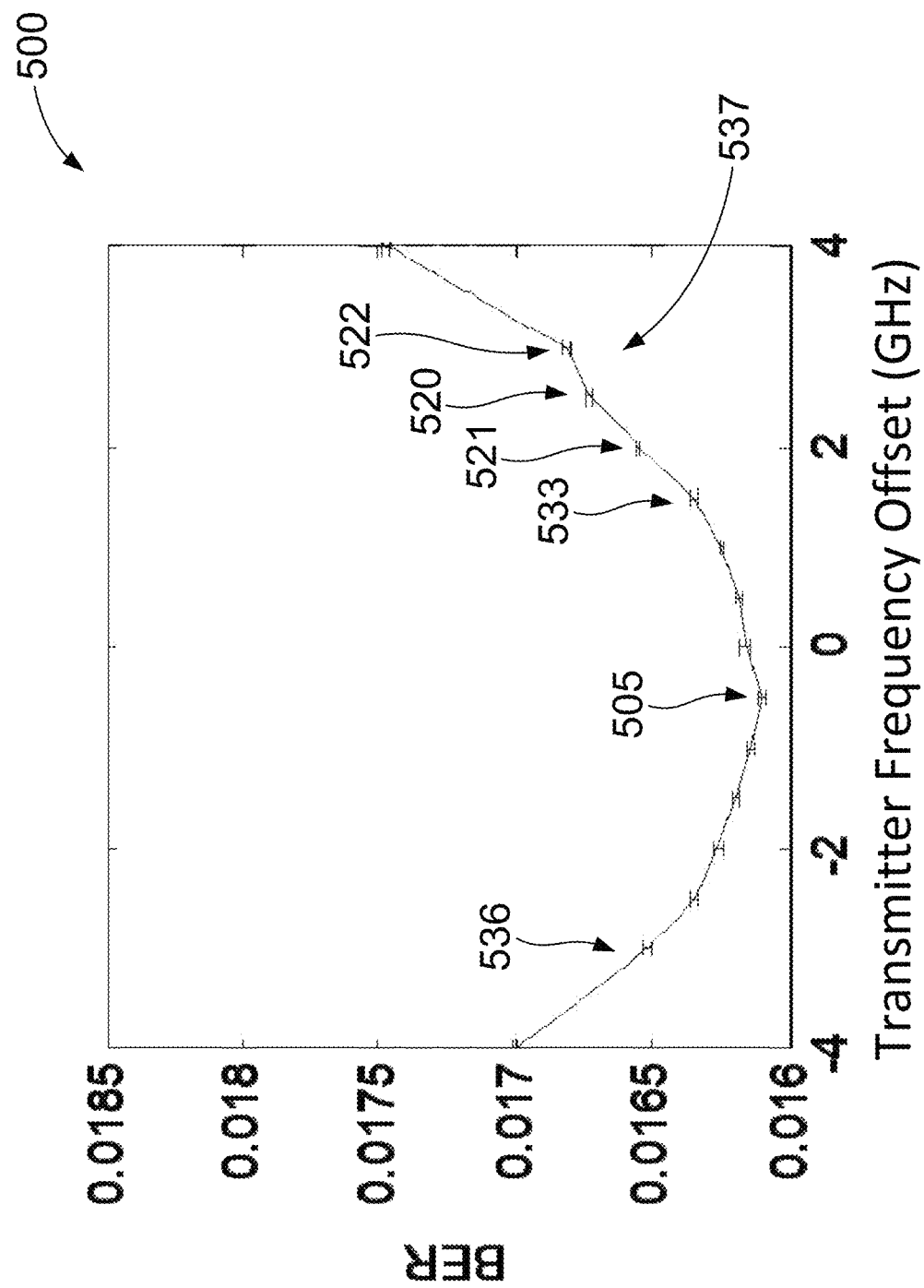
FIG. 5 depicts an example of bit error rate (BER) measured as a function of a transmitter frequency offset, in accordance with various embodiments of the present disclosure.

FIG. 5 depicts an example of BER 500 measured as a function of a transmitter frequency offset. The transmitter frequency offset, as referred to herein, is a frequency difference between a central frequency of the transmitted optical channel signal, and its nominal value. The nominal value of the central frequency of the transmitted optical channel signal, as provided in FIG. 5, was the central frequency of the spectrum of the optical channel signal emitted initially by the laser light source, in accordance with manufacturer's settings.

In the BER measurement depicted in FIG. 5, the optical signal was a 34 gigabaud (Gbaud) 16 quadrature amplitude modulation (QAM) coherent signal. An optical filter implemented through the use of a WSS was used. During the measurements, the optical filter transmittance was stable with regards to frequency, and therefore FIG. 5 illustrates also BER 500 as a function of frequency offset 440.

FIG. 5 illustrates that BER 500 generally increases with an increase of absolute value of frequency offset 440. BER 500 has a minimum BER 505 when frequency offset 440 is approximately 0. In this particular measurement, the optical channel spectrum 410 was initially (at the nominal value of the central frequency of the transmitted optical channel signal) detuned from the optical filter transmittance 430. This initial detuning of optical channel spectrum 410 resulted in higher BER at zero transmitter frequency offset, compared to minimum BER 505.

For example, if filter reference frequency 435 is stable and frequency offset 440 is negative, BER decreases 536 with increase in signal reference frequency 420. However, if filter reference frequency 435 is stable and frequency offset 440 is positive, BER increases 537 with increase in signal reference frequency 420.

The systems and methods as described herein use BER 500 behaviour with regards to frequency offset 440 (as illustrated in FIG. 5) in order to minimize BER, or to reduce it to an acceptable level. The disclosed embodiments permit detuning of optical channel spectrum 410 and its signal reference frequency 420 towards a signal target reference frequency, thus reducing frequency offset 440 to approximately 0 (or at least below a threshold).

As referred to herein, the signal target reference frequency is approximately equal to the value of signal reference frequency 420 when BER 500 is the lowest. With reference to FIG. 5, the signal target reference frequency is signal reference frequency 420 that provides BER minimum 505. With reference also to FIG. 4, the signal target reference frequency corresponds to filter reference frequency 435, and therefore provides zero frequency offset 440, if both optical filter transmittance 430 and optical channel spectrum 410 are symmetric.

In order to reduce impairment of signal transmission in the optical network, embodiments of the present invention can aid in reducing the asymmetric filtering. Asymmetric filtering can be reduced by shifting optical channel spectrum 410 such that its signal reference frequency 420 (for example, the signal central frequency) is shifted towards the signal target reference frequency. When the signal reference frequency 420 aligns with the signal target reference frequency, the BER should reach its minimum 505.

The receiver 360 is configured to determine whether optical channel spectrum 410, and therefore signal reference frequency 420, needs to be detuned towards the lower or the higher frequencies. In other words, receiver 360 is configured to determine whether signal reference frequency 420 needs to be increased or decreased. The receiver 360 then transmits to transmitter 350 this information and a request to shift optical channel spectrum 410.

In addition to the request to shift optical channel spectrum 410, transmitter 350 may also receive from receiver 360 a value of frequency adjustment step. Alternatively, transmitter 350 may have a pre-determined frequency adjustment step, as described in detail below. By shifting signal reference frequency 420 step-by-step with instructions received from receiver 360, transmitter 350 is configured to reduce BER and to achieve transmission of the original signal reference frequency being approximately equal to the signal target reference frequency.

In order to determine whether signal reference frequency 420 needs to be increased or decreased, receiver 360 is configured to measure BER at frequencies that are above and below signal reference frequency 420.

Referring again to FIG. 4 and FIG. 5 and assuming that signal optical spectrum 410 originally has an original signal reference frequency 520, receiver 360 is configured to measure $BER_1$ (also referred to herein as a "first BER") when the received optical channel signal is detuned to a first signal reference frequency 521 and to measure $BER_2$ (also referred to herein as a "second BER") when the received optical channel signal is detuned to a second signal reference frequency 522. The receiver 360 is then configured to determine whether optical channel spectrum 410, and therefore original signal reference frequency 520, needs to be shifted towards a higher or the lower frequency based on the determined difference between $BER_2$ and $BER_1$ or vice versa. It should be noted that original signal reference frequency 520, first signal reference frequency 521, and second signal reference frequency 522 are illustrated in FIG. 5 with reference to their corresponding points of the graphical dependence of BER on the transmitter frequency offset.

It should be noted that a drift of filter reference frequency 435 is usually a slow process (for example, of the order of minutes). The receiver 360 may measure BER such that decrease and increase in signal reference frequency 420 towards first signal reference frequency 521 or second signal reference frequency 522, respectively, correspond to increase or decrease of relative frequency offset 440. The filter reference frequency 435 is assumed to be stable during BER measurements.

If the original signal reference frequency is such that BER increases with the increase of the original signal reference frequency, then $BER_2-BER_1$ is positive. If $BER_2-BER_1$ is positive, relative frequency offset 440 may be reduced by reducing of the original signal reference frequency. If the original signal reference frequency is such that BER decreases with the increase of the original signal reference frequency, then $BER_2-BER_1$ is negative. If $BER_2-BER_1$ is negative, the relative frequency offset 440 may be reduced by increasing the original signal reference frequency.

In the embodiment illustrated in FIG. 5 for original signal reference frequency 520, receiver 350 would determine that original signal reference frequency 520 of the transmitted optical channel signal needs to be shifted towards the lower frequencies to reduce the frequency offset.

In accordance with present technology, in order to determine $BER_1$ and $BER_2$ at receiver 360, transmitter 350 is configured to transmit a dithered optical channel signal.

Figure 6:
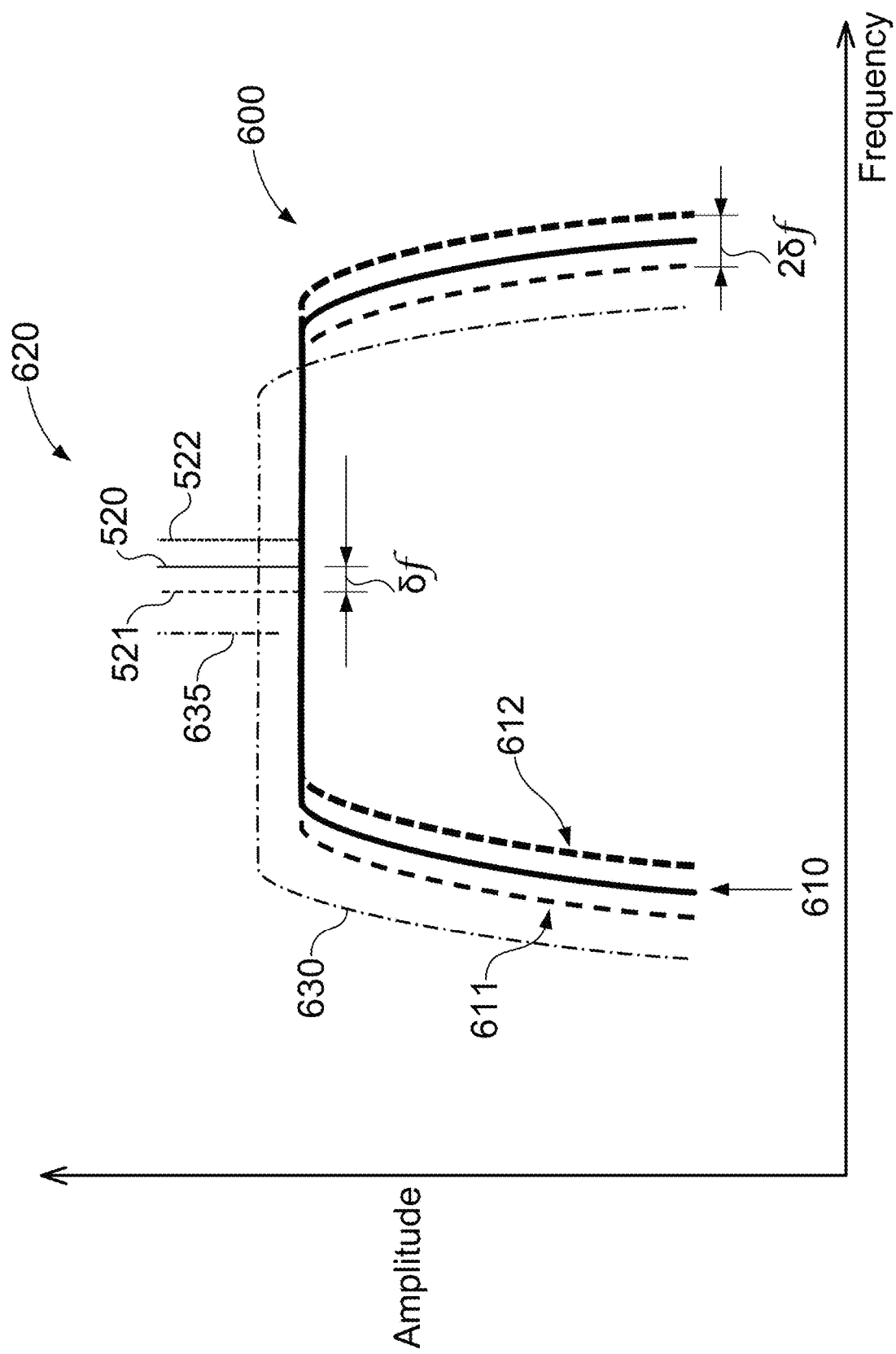
FIG. 6 illustrates a dithered optical channel signal, in accordance with various embodiments of the present disclosure.

FIG. 6 depicts dithering of the optical channel signal, in accordance with embodiments of technology described herein. FIG. 6 also depicts optical filter transmittance 630 and filter reference frequency 635.

As referred to herein, the dithering of the optical channel signal is configured to alternately detune, in a repetitive manner, the optical channel spectrum from the original optical channel spectrum 610 between lower frequencies and higher frequencies.

In order to obtain a dithered optical channel signal 600, optical channel spectrum 610 is dithered with regards to frequency by transmitter 350. In other words, in order to obtain dithered optical channel signal 600, and therefore dithered signal reference frequency 620, the optical channel spectrum 610 is sequentially and repetitively detuned to the lower frequencies by dithering amplitude δf (e.g., the signal reference frequency reaching first signal reference frequency 521) and to the higher frequencies by dithering amplitude δf (e.g., the signal reference frequency reaching second signal reference frequency 522).

As illustrated in FIG. 6, the dithering amplitude δf is the amplitude of dithering applied to optical channel spectrum 610 and corresponds to a frequency difference between second signal reference frequency 522 and original signal reference frequency 520. A difference between second reference frequency $f_1$ 522 and first signal reference frequency $f_2$ 521 may be approximately 2*δf. For example, a representative dithering amplitude δf may be approximately 100 MHz.

With reference to FIG. 6, when optical channel spectrum 610 is detuned by dithering amplitude δf to lower frequencies, optical channel spectrum 610 becomes a negatively detuned optical channel spectrum 611. When optical channel spectrum 610 is detuned by dithering amplitude δf to higher frequencies, optical channel spectrum 610 becomes a positively detuned optical channel spectrum 612.

Figure 7:
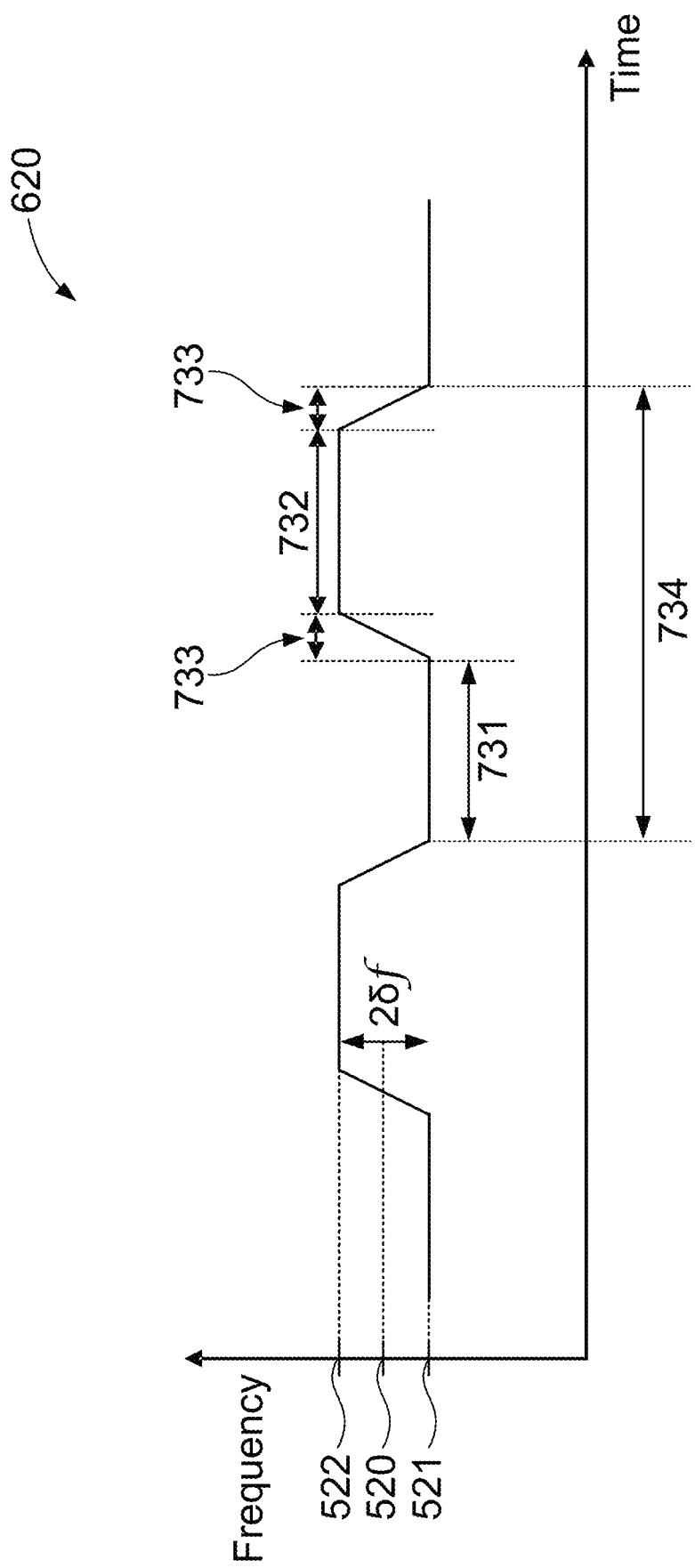
FIG. 7 depicts a dithered signal reference frequency of the dithered optical channel signal as a function of time, in accordance with various embodiments of the present disclosure.

FIG. 7 depicts dithered signal reference frequency 620 of dithered optical channel signal 600 as a function of time, in accordance with embodiments of technology described herein.

The dithered signal reference frequency 620 dithers (alternates) between first reference frequency $f_1$ 521 and second signal reference frequency $f_2$ 522.

As described above, the difference between second reference frequency $f_1$ 522 and first signal reference frequency $f_2$ 521 is approximately 2*δf, and:

$$f_1 = f_c - \delta f, \tag{1}$$

$$f_2 = f_c + \delta f. \tag{2}$$

where $f_c$ is original signal reference frequency 520.

It should be understood that a corresponding function may be used for signal central wavelength $\lambda_c$ varying between shorter wavelength $\lambda_S$ and longer wavelength $\lambda_L$.

It should also be understood that the whole optical channel spectrum 610 is dithered and therefore detuned along with signal reference frequency $f_c$ 520. Dithering of optical channel spectrum 610 is illustrated in FIG. 6 by negatively detuned optical channel spectrum 611 and positively detuned optical channel spectrum 612.

Referring again to FIGS. 5-7, during a first time period 731, signal reference frequency is tuned to first signal reference frequency 521. During a second time period 732, signal reference frequency is tuned to second signal reference frequency 522. In illustrated embodiment, first signal reference frequency 521 is lower than second signal reference frequency 522. As noted above, first signal reference frequency 521 may be lower than original signal reference frequency 520 by dithering amplitude δf and second signal reference frequency 522 may be higher than original signal reference frequency 520 by dithering amplitude δf.

During a dithering period 734, dithered signal reference frequency 620 is detuned to first reference frequency $f_1$ 521 during first time period 731 and to second signal reference frequency $f_2$ 522 during second time period 732. As depicted in FIG. 7, dithering period 734 comprises both first time period 731 and second time period 732. The dithering period 734 may be, for example, 0.01 seconds (corresponding to 1/(100 Hz)). The dithering period 734 may repeat every 0.01 seconds during a monitoring time period. First time period 731 may be approximately equal to second time period 732.

In order to avoid penalty induced by frequency dithering, a maximum slew rate between first signal reference frequency 521 and second signal reference frequency 522 may be defined, for example, by characteristics of receiver 360. The duration of transition time period 733 may be chosen so that receiver 360 may track the frequency change without additional penalty. As a non-limiting example, first time period 731 may be 8 milliseconds, and transition time period 733 may be 1 millisecond. It should be understood that different lengths of first time period 731 and transition time period 733 may be used in order to provide high periodicity of detuning of signal reference frequency 620 (for example, the dithering period 734 being 0.01 seconds) and at the same time to reduce additional penalty.

The frequency dithering may continue during the monitoring time period. The monitoring time period is longer than several dithering periods 734. The monitoring time period may be, for example, several seconds or minutes.

In order to improve accuracy of measurements and to reduce impact of noise on BER measurements, BER is measured multiple times during the monitoring time period and the result is averaged. For example, the first BER ($BER_1$) is measured multiple times during first time periods 731 and then averaged. The second BER ($BER_2$) may be measured multiple times during second time periods 732 and then averaged.

Figure 8:
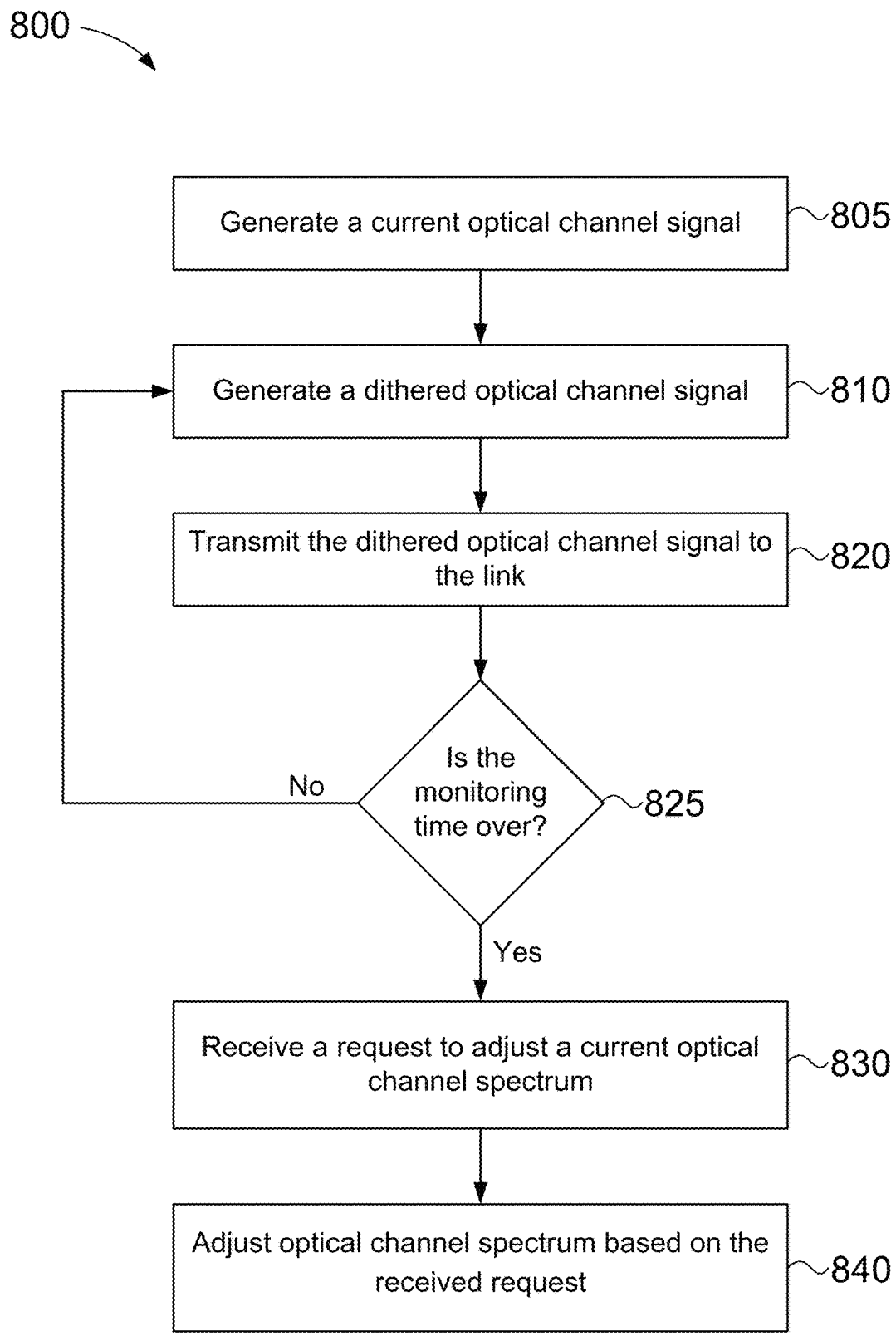
FIG. 8 depicts a flowchart illustrating a method for controlling an optical channel signal in an optical network, in accordance with various embodiments of the present disclosure.

FIG. 8 depicts a flowchart that illustrates a method 800 for controlling an optical channel signal in an optical network, in accordance with embodiments of technology described herein.

The transmitter 350 generates 805 an original optical channel signal and then generates 810 the dithered optical channel signal 600. The transmitter 350 applies the frequency dithering to the optical channel signal such that dithered optical channel signal 600 has first signal reference frequency 521 during first time period 731 and second signal reference frequency 522 during second time period 732. Such frequency detuning pattern repeats and the frequency dithering continues during the monitoring time period. During this monitoring time period, transmitter 350 transmits 820 dithered optical channel signal 600 to the optical link.

In other words, the dithered signal reference frequency alternates (oscillates) between first signal reference frequency 521 and a second signal reference frequency 522.

The frequency dithering may be performed by the laser light source 352 located in transmitter 350. The optical channel spectrum and therefore the laser reference frequency (for example, the laser central frequency and/or the laser peak frequency) may be detuned, for example, by changing the electrical current applied to the laser light source 352, by changing the temperature, or using other methods known in the art. The laser reference frequency may be detuned sequentially and repetitively such that it is dithered between first signal reference frequency 521 and second signal reference frequency 522. Alternatively, the frequency dithering may be performed digitally by frequency detuning in transmitter's DSP 354.

After the monitoring time period is over 825, transmitter 350 is configured to receive 830 a request 357 from receiver 360 to adjust the original optical channel spectrum of the transmitted optical channel signal based on a BER difference. The BER difference is determined as a difference between the second BER ($BER_2$) and the first BER ($BER_1$), where the first BER was measured and averaged during the first time periods 731, and the second BER was measured and averaged during second time periods 732.

The request to adjust the optical channel spectrum may be a request to shift the optical channel spectrum. The request to shift the optical channel spectrum may include an indication of a direction of a shift of the optical channel spectrum with regards to frequency, or, similarly, an indication of a direction of a shift of the original signal reference frequency. It should be understood that shifting of the optical channel spectrum with regards to frequency and shifting of the original signal reference frequency with regards to frequency in the same direction provide the same effect on BER.

The direction of the shift of the optical channel spectrum (or the shift of the original signal reference frequency) with regards to frequency may be positive, corresponding to a shift of the optical channel spectrum (or that of the original signal reference frequency) towards higher frequencies. The direction of the shift of the optical channel spectrum (or the shift of the original signal reference frequency) with regards to frequency may be negative, corresponding to the shift of the optical channel spectrum (or that of the original signal reference frequency) towards lower frequencies.

For example, the indication of the direction of the shift may be any indication permitting transmitter 350 to determine whether the shift should be positive or negative, or whether the optical channel spectrum (or the original signal reference frequency) should not be shifted. The request to adjust the optical channel spectrum may include an indication whether the BER difference, determined by receiver 360, is positive or negative.

The request to adjust the optical channel spectrum may include a request to shift original signal reference frequency 520 to the higher or to the lower frequencies. With reference to FIG. 5 and to BER of original signal reference frequency 520 depicted therein, transmitter 350 would receive a request to decrease original signal reference frequency 520.

In response to the received request, transmitter 350 shifts 840 original signal reference frequency 520, by frequency adjustment step Δf, according to instructions 357 received from receiver 360.

The frequency adjustment step Δf may be pre-determined at transmitter 350, transmitted from receiver 360 (e.g. along with the request to tune the original signal reference frequency), or determined at transmitter 350 based on dithering amplitude δf.

For example, the frequency adjustment step may be approximately equal to dithering amplitude δf or may be longer or shorter than dithering amplitude δf. The frequency adjustment step Δf may be approximately equal to two dithering amplitudes 2*δf. The frequency adjustment step Δf may be, for example, approximately 0.1 GHz or approximately 0.2 GHz.

After receiving instructions from receiver 360, transmitter 350 shifts optical channel spectrum 610. The transmitter 350 shifts original signal reference frequency 520 by the frequency adjustment step Δf to an adjusted signal reference frequency 533.

It should be noted that the term "original signal reference frequency" is used herein to refer to a signal reference frequency of the optical channel signal (also referred to herein as the "original optical channel signal") generated by transmitter 350 without and/or before frequency dithering. Based on the request received from receiver 360, transmitter 350 may shift the original signal reference frequency by the frequency adjustment step towards the adjusted signal reference frequency. This adjusted signal reference frequency becomes a new original signal reference frequency for the next frequency adjustment. The frequency adjustment with the frequency adjustment steps, based on the BER difference, may be repeated until the original signal reference frequency becomes approximately equal to the signal target reference frequency.

It should also be noted that the terms "detuning", "detuned", "detune" are used herein with regards to dithering of the signal reference frequency of the optical channel signal. The terms "shifting", "shifted", "shift" are used herein with regards to applying of a frequency adjustment step by the transmitter after receiving the instructions from the receiver. It should be understood that increasing or decreasing the original signal reference frequency by shifting the original signal reference frequency and detuning when dithering of the optical channel signal may be performed using the same techniques known in the art.

For example, shifting and/or detuning of original signal reference frequency 520 may be performed by the laser located in transmitter 350. The optical channel spectrum and therefore the laser reference frequency may be shifted and/or detuned, for example, using changes in current, temperature or using other methods known in the art for shifting the laser reference frequency. Alternatively, the optical channel spectrum and therefore original signal reference frequency 520 may be shifted and/or detuned digitally by using DSP 354 located in transmitter 350.

For example, the frequency dithering of the optical channel signal may be performed digitally, while original signal reference frequency 520 may be shifted by laser light source 352 located in transmitter 350, after receiving the request from receiver 350.

Figure 9:
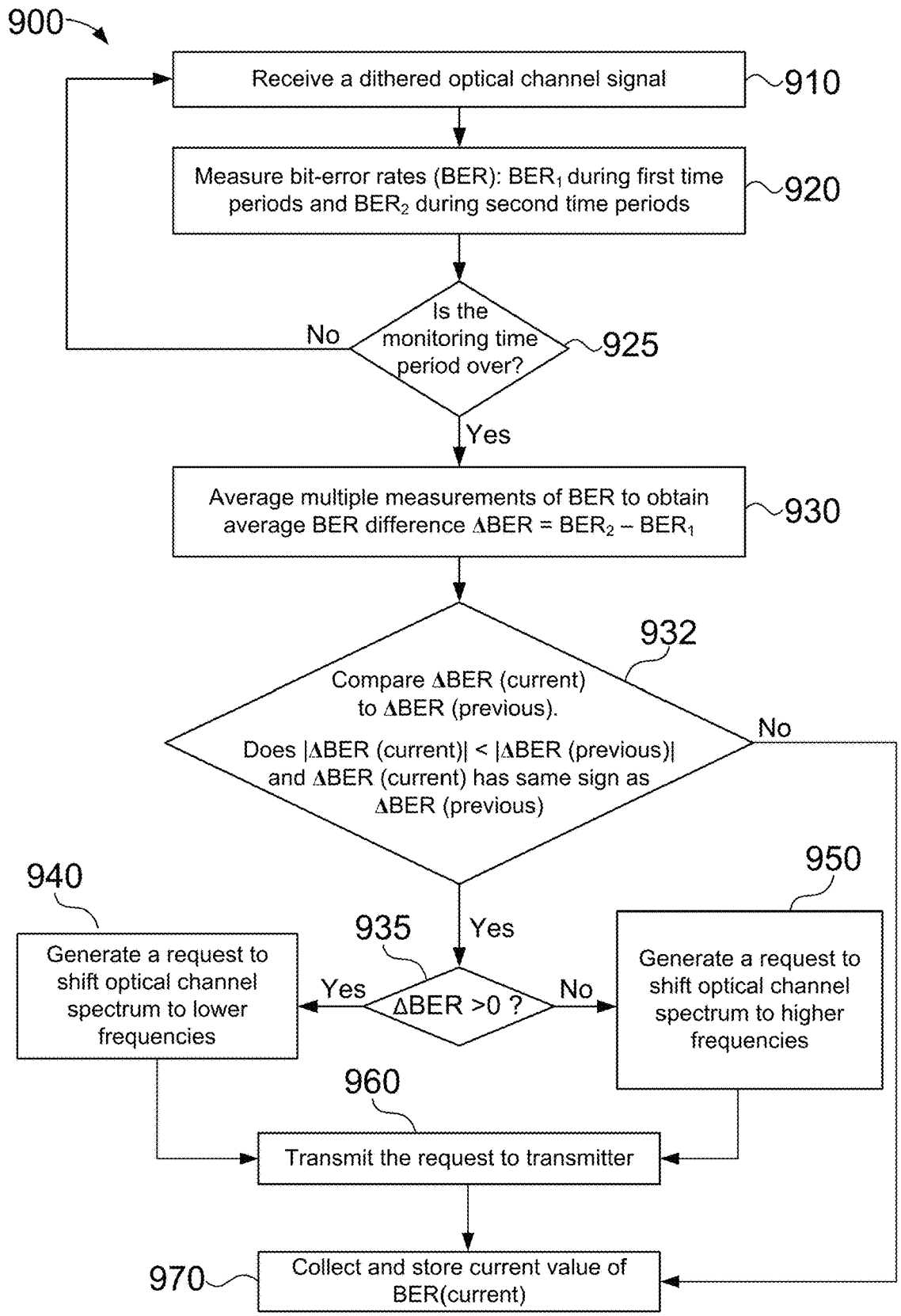
FIG. 9 depicts a flowchart illustrating a method for controlling an optical network equipment, in accordance with various embodiments of the present disclosure.

FIG. 9 depicts a flowchart that illustrates a method 900 for controlling optical network equipment, in accordance with embodiments of technology described herein. The receiver 360, e.g. at photodetector 362, receives 910 dithered optical channel signal 620. The receiver 360 then measures 920 BER. For example, BER may be determined by receiver processor 364.

The BER is measured 920 each time signal reference frequency 520 is detuned to first signal reference frequency 521 ($BER_1$) or second signal reference frequency 522 ($BER_2$). These measurements are performed synchronously with frequency dithering, so that receiver 360 may measure and collect values of $BER_1$ and $BER_2$ separately from each other.

Different techniques may be used to inform receiver 360 of signal reference frequency change. For example, transmitter 350 may transmit to receiver 360 information in overhead bits about the reference frequency detuning from first signal reference frequency 521 to second signal reference frequency 522 and vice versa.

In order to detect that the signal reference frequency has been detuned from first signal reference frequency 521 to second signal reference frequency 522 and vice versa, local oscillator frequency offset (LOFO) coherent detection at coherent receiver 360 may also be used.

The receiver 360 separately averages 930 $BER_1$ and $BER_2$ values, each measured multiple times during the monitoring time period, to improve the signal to noise ratio. Averaging BER values may help to smooth out natural fluctuations in BER measurements.

For each monitoring time period, an averaged BER difference $\Delta BER$ is obtained from averaged $BER_1$ and averaged $BER_2$:

$$\Delta BER = BER_2 - BER_1, \qquad (3)$$

where $BER_2$ is the averaged BER calculated during second time periods 732, and $BER_1$ is the averaged BER calculated during first time periods 731.

The BER difference $\Delta BER$ is then analyzed. If receiver 360 determines 935 that the BER difference $\Delta BER$ is positive, i.e. $\Delta BER > 0$, the signal reference frequency 520 is higher than the signal target reference frequency. Therefore, if $\Delta BER$ is positive ($\Delta BER > 0$), receiver 360 generates 940 a request to shift optical channel spectrum 610, and therefore original signal reference frequency 520, to lower frequencies. The receiver 360 then transmits 960 to transmitter 350 the generated request (instructions) in order to reduce BER.

If receiver 360 determines 935 that BER difference $\Delta BER$ is negative, i.e. $\Delta BER < 0$, the relative frequency offset is negative. The signal reference frequency is lower than the signal target reference frequency. Therefore, if $\Delta BER < 0$, receiver 360 generates 950 a request to shift optical channel spectrum 610, and therefore original signal reference frequency 520, to higher frequencies. The receiver then transmits 960 to transmitter 350 the generated request in order to reduce BER.

As mentioned above, the request received by transmitter 350 from receiver 360 may include the value of frequency adjustment step $\Delta f$.

The instructions (the generated request) 357 may be sent from receiver 360 to transmitter 350 and signal reference frequency 520 is shifted by one frequency adjustment step $\Delta f$ after another, until BER is minimized.

In some embodiments, receiver 360 may be configured to collect and store 970 at least one value of $\Delta BER$. Collection and storage of $\Delta BER$ values may permit receiver 360 to compare 932 the current value of BER difference $\Delta BER$ (current) with the previous value of BER difference $\Delta BER$ (previous), i.e. with BER difference measured during previous monitoring time period. For example, if $\Delta BER$ (current) has different sign than $\Delta BER$(previous) and an absolute value of $\Delta BER$(current) is less than an absolute value of $\Delta BER$(previous), then receiver 360 may abstain from sending any request to transmitter 350.

In some embodiments, receiver 350 may also compare $\Delta BER$(current) to a pre-determined minimum BER in order to determine whether to send the instructions to receiver 350 or to abstain.

In some embodiments, receiver 360 may be configured to determine a relative BER change $\gamma$:

$$\gamma = \frac{BER_2 - BER_1}{BER_1 + BER_2}. \qquad (4)$$

For example, receiver 360 may compare the relative BER change with a pre-determined threshold relative BER change TH. For example, if $\gamma >= TH$, receiver 360 may instruct transmitter 350 to decrease signal reference frequency 520. If $\gamma <= -TH$ receiver 360 may instruct transmitter 350 to increase signal reference frequency 520. If −TH<γ<TH, receiver 360 may abstain from instructing transmitter 350 to change signal reference frequency 520.

In at least one embodiment, receiver 360 may also instruct a controller of an optical filter to adjust operation of the optical filter. The optical filter may be requested to shift optical filter transmittance 430, 630 by increasing or decreasing optical filter reference frequency 435, 635 in order to reduce BER. The request transmitted to the controller of the optical filter may indicate the direction of the shift of the optical filter transmittance 430, 630 with regards to frequency. The request may comprise an indication of a desired increase or decrease of the optical filter reference frequency 435. The request may be an indication of whether the determined BER difference is positive or negative. Such technique may be practical if there is one optical filter in optical link 300. Instructing the controller of the optical filter may be also done in addition to instructing transmitter 350 to adjust the transmitted optical channel signal.

Figure 10:
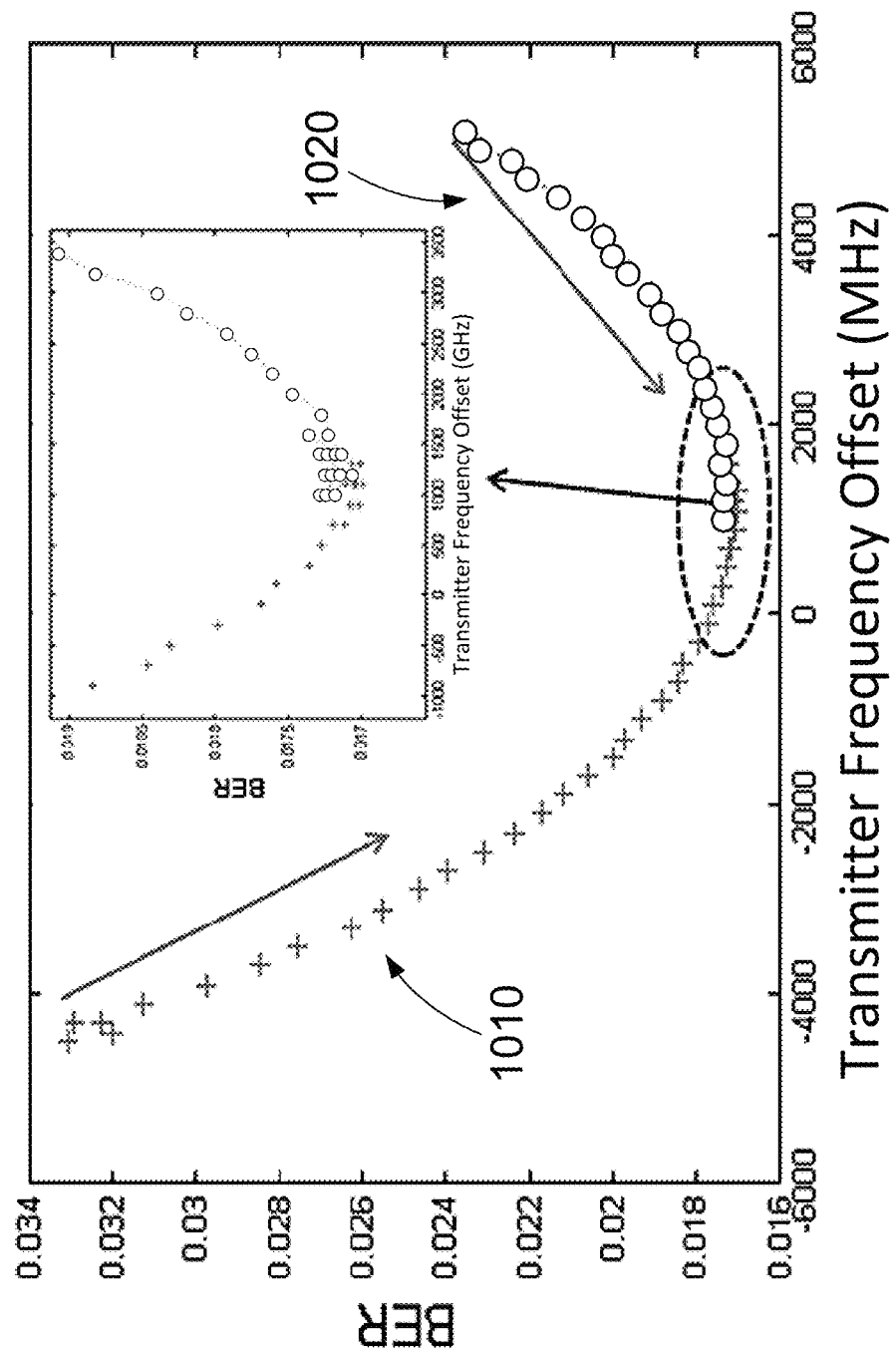
FIG. 10 depicts experimental results of an adjustment of the signal reference frequency of the optical channel signal, in accordance with various embodiments of the present disclosure.

FIG. 10 depicts experimental results of an adjustment of signal reference frequency 520 to minimize BER, obtained in accordance with embodiments of technology described herein. FIG. 10 depicts BER measured in a first experiment 1010 and BER measured in a second experiment 1020. The signal reference frequency 520 was initially intentionally offset to about −5 GHz in first experiment 1010. In second experiment 1020, signal reference frequency 520 was initially intentionally offset to about +5 GHz.

BER was measured each time original signal reference frequency 520 was shifted by frequency adjustment step Δf at transmitter 350, in response to the request received from receiver 360. The embodiments disclosed herein permitted to successfully reduce BER of the received optical channel signal.

The disclosed embodiments may be used when the optical signal has to pass through several optical filters. It is possible to reduce BER and the frequency offset of signal reference frequency with regards to an average of filter reference frequencies.

Figure 11:
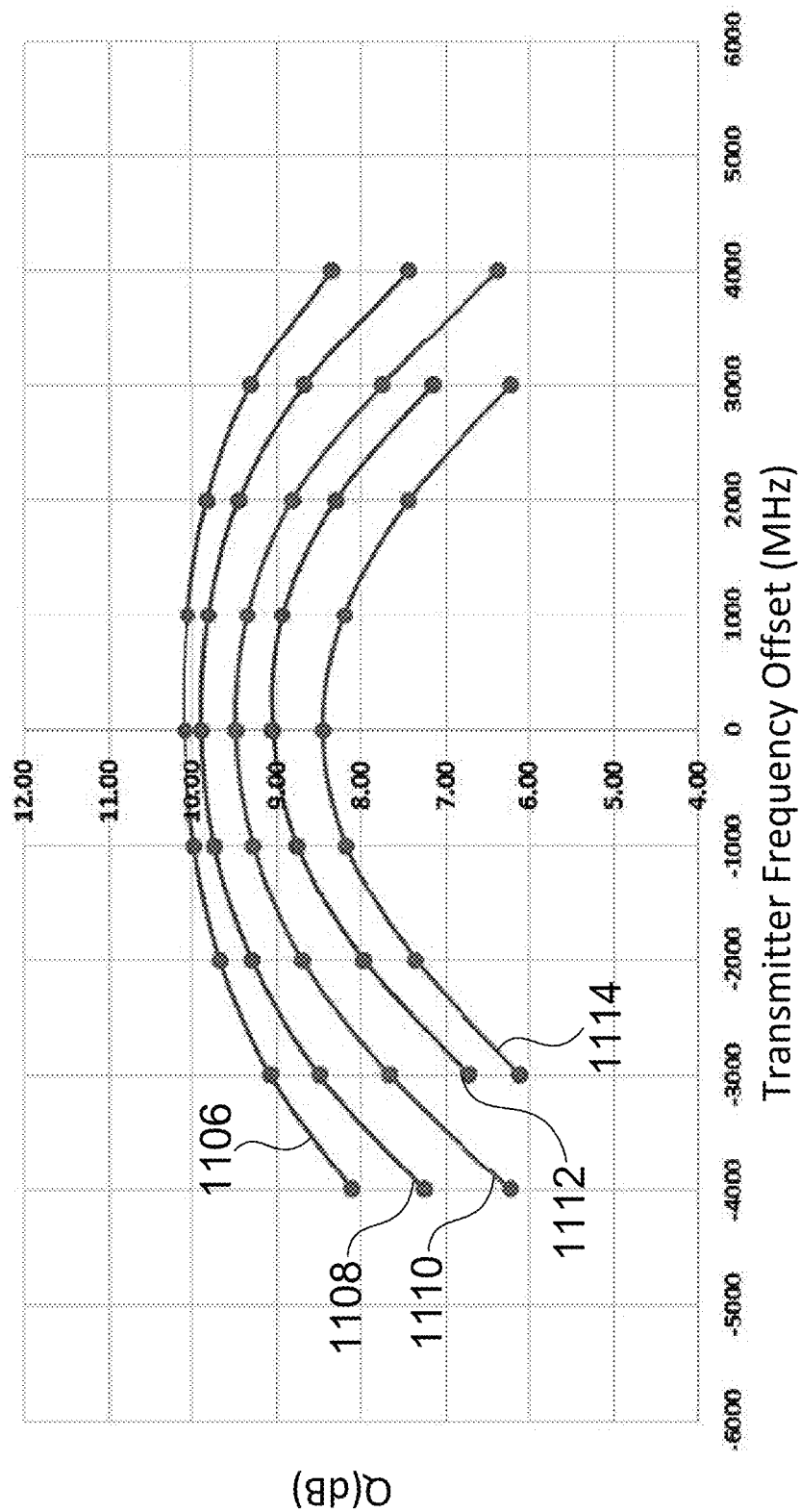
FIG. 11 depicts experimental results of an adjustment of the signal reference frequency of the optical channel signal propagated through several cascaded wavelength selective switches (WSSs), in accordance with various embodiments of the present disclosure.

FIG. 11 depicts experimental results of adjusting of the signal reference frequency of the optical channel signal propagated through several cascaded WSSs, in accordance with embodiments of technology described herein. The dithered optical channel signal was transmitted from transmitter 350, through several cascaded WSS, to receiver 360. Based on measured BER difference, as described herein, receiver 360 instructed transmitter 350 to shift signal reference frequency 520.

FIG. 11 depicts a Q-factor 1100 measured as a function of the transmitter frequency offset. The Q-factor 1100 was measured each time original signal reference frequency 520 has been shifted. The dithered optical channel signal propagated through 6 WSS (curve 1106), 8 WSS (curve 1108), 10 WSS (curve 1110), 12 WSS (curve 1112), and 14 WSS (curve 1106). FIG. 11 illustrates that the embodiments disclosed herein may permit to adjust optical channel spectrum 610 and therefore signal reference frequency 520 when optical link 300 has several optical filters.

Figure 12:
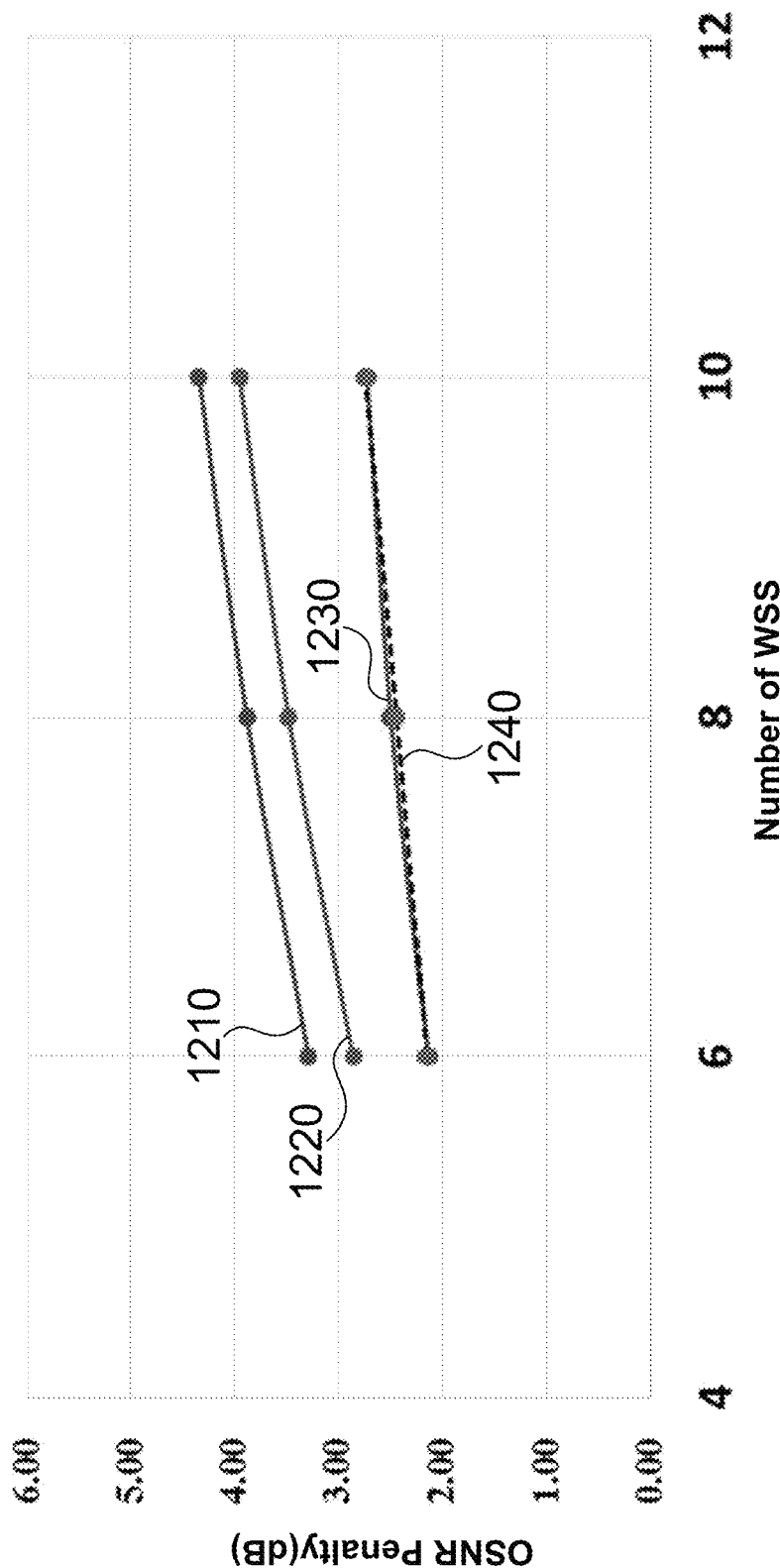
FIG. 12 depicts measured optical signal to noise ratio (OSNR) penalty of an optical channel signal propagated through several WSSs and adjusted in accordance with various embodiments of the present disclosure.

FIG. 12 depicts OSNR penalty measured for received optical channel signal after it has propagated through several WSSs and adjusted in accordance with embodiments of technology described herein. OSNR penalty is depicted with regards to a quantity of cascaded WSS (6, 8, and 10), through which the dithered optical channel signal propagated.

The signal reference frequency of the transmitted optical channel signal was initially offset by −2.5 GHz (curve 1210) and +2.5 GHz (curve 1220) from the nominal transmitter frequency. Curve 1230 was measured with zero frequency offset between signal reference frequency 520 and the average of filter reference frequencies of the cascaded WSSs. Dashed curve 1240 represents OSNR penalty for the received optical channel signal after the adjustment of signal reference frequency of the transmitted optical channel signal in accordance with technology described herein.

FIG. 12 illustrates that initially detuned signal reference frequency, and therefore initially detuned optical channel spectrum, may be adjusted in accordance with embodiments of technology described herein to reduce OSNR penalty. The level of OSNR penalty 1240 measured for the received optical channel signal after the adjustment approximately coincides with OSNR penalty 1230 measured when the frequency offset of the transmitted optical channel signal was approximately zero.

The disclosed embodiments may be applied to dual-carrier optical signal transmission. Dual-carrier transmission is achieved by transmitting two carriers bundled as one channel. The two carriers have a reduced spacing between them.

Figures 13A, 13B:
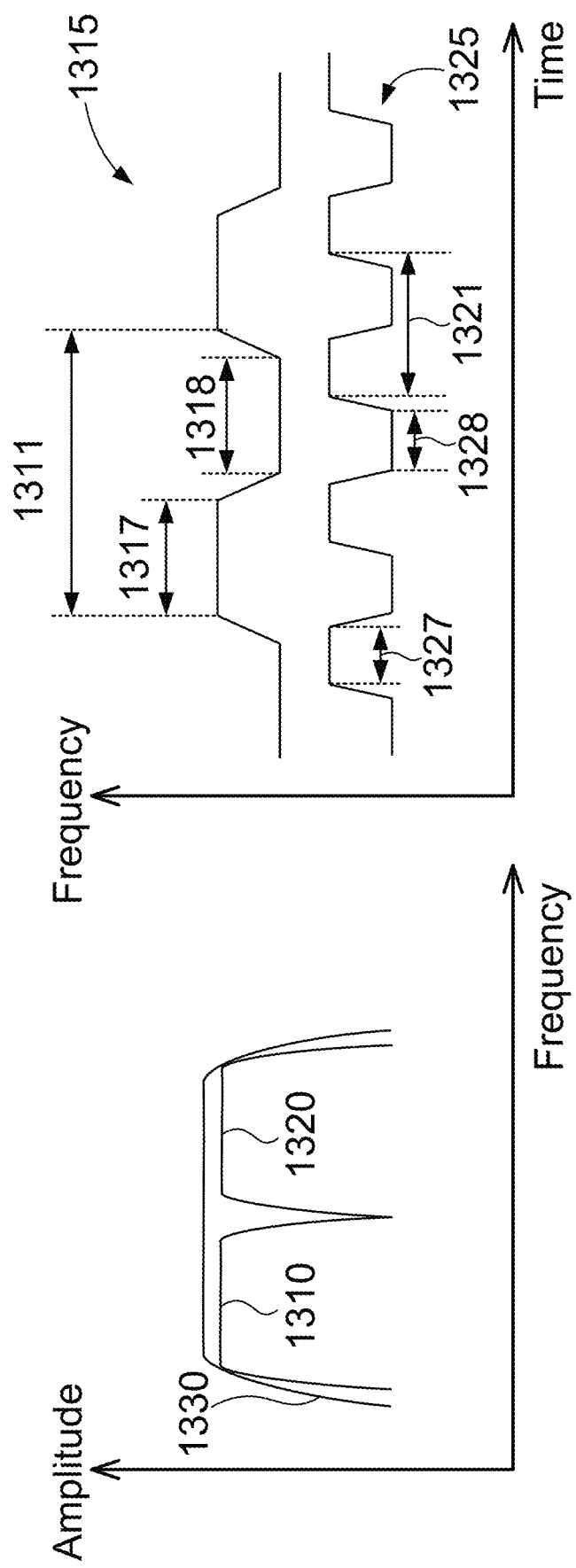
FIG. 13A illustrates a dual-carrier optical signal and an optical filter transmittance, in accordance with various embodiments of the present disclosure.
FIG. 13B depicts a first carrier reference frequency of a first dithered carrier signal and a second carrier reference frequency of a second dithered carrier signal as functions of time, in accordance with various embodiments of the present disclosure.

FIG. 13A depicts dual-carrier optical signal 1300 with two carriers bundled as one channel, in accordance with embodiments of technology described herein. A first carrier 1310 and a second carrier 1320 are transmitted in one channel, and are filtered by one optical filter having optical filter transmittance 1330. For example, first carrier 1310 and second carrier 1320 may be two 200 Gbps signals to form one 400 Gbps channel.

FIG. 13B depicts a first carrier reference frequency 1315 as a function of time in a first dithered carrier and a second carrier reference frequency 1325 as a function of time in a second dithered carrier, in accordance with embodiments of technology described herein. To avoid interference between the detection of the two carriers, dithering may be applied orthogonally. Two carriers 1310, 1320 may have different dithering periods: a first dithering period 1311 of first carrier 1310 may be different from a second dithering period 1321 of second carrier 1320. For example, dithering frequency step may be applied more frequently to the second carrier 1320, as illustrated in FIG. 13B. For example, one carrier signal may have first dithering period 1311 of 0.01 seconds and another carrier signal may have second dithering period 1321 of 0.005 seconds.

The frequency dithering may be applied to first carrier 1310 and second carrier 1320 with different time periods 1317, 1327, 1318, 1328. For example, first time period 1317 and second time periods 1318 may be longer for dithering applied to first carrier 1310, compared to third time period 1327 and fourth time period 1328 for dithering applied to second carrier 1320, as illustrated in FIG. 13B.

Frequency dithering as described herein may be used to balance crosstalk and filtering in dual-carrier optical signal transmission. The disclosed embodiments permit to reduce the transmission impairment for each carrier 1310, 1320 separately and for dual-carrier optical signal 1300.

The receiver 360 may measure separately BER of first carrier 1310 (the first BER and the second BER) and BER of second carrier 1320 (a third BER and a fourth BER) multiple times during the monitoring time period. The third BER may be measured and averaged during third time periods 1327 and the fourth BER may be measured and averaged during the fourth time periods 1328.

The receiver 360 may then determine whether to shift a first optical channel spectrum of first carrier 1310 and a second optical channel spectrum of second carrier 1320 separately for each carrier 1310, 1320, in accordance with technology described above. The receiver 360 may then send to transmitter 350 a request to shift the first optical channel spectrum of first carrier 1310 and the second optical channel spectrum of second carrier 1320 with regards to frequency. The request may comprise an indication of a direction of shifting of the first optical channel spectrum of first carrier 1310 and/or a direction of shifting of the second optical channel spectrum of second carrier 1320 with regards to frequency.

In addition to determination whether to shift and how to shift the first optical channel spectrum of first carrier 1310 and whether to shift and how to shift the second optical channel spectrum of second carrier 1320, values of BER measured for first carrier 1310 may be compared with values of BER measured for second carrier 1320. Such comparison of BER for two carriers may help to balance both crosstalk and filtering in dual-carrier optical signal transmission.

The receiver 360 may determine a difference between values of BER of first carrier 1310 (for example, the first BER, the second BER, and/or their average) and values of BER of second carrier 1320 (for example, the third BER, the fourth BER, and/or their average) and compare them. For example, receiver 360 may determine a difference between the first BER and the third BER. Alternatively, receiver 360 may determine a difference between averaged values of BER of first carrier 1310 and averaged values of BER of second carrier 1320 and may use it when generating the request to adjust operation of the optical network equipment.

If the difference, determined between averaged values of BER of first carrier 1310 and averaged values of BER of second carrier 1320, is higher than a threshold carrier BER difference, and BER of first carrier 1310 and BER of second carrier 1320 are each higher than a threshold carrier BER, then receiver 360 may request transmitter 350 to adjust first carrier 1310 and second carrier 1320. If such difference is about or less than a threshold carrier BER difference, and BER of first carrier 1310 and BER of second carrier 1320 are each about or less than a threshold carrier BER, then receiver 360 may abstain from sending a request to transmitter 350.

One skilled in the art will appreciate that in the above described embodiments, the effects of asymmetric filtering are mitigated. Asymmetric filtering may occur when an optical signal has a spectrum that is offset (by a relative frequency offset) from the optical filter transmittance. Even if the optical signal spectrum and the optical transmittance are aligned at the time of transmission, there may be a shift in the signal spectrum during transmission. Because these shifts cannot be completely modeled during deployment of the system, a dynamic method of mitigating the asymmetric filtering is provided herein. The misalignment between the optical filter transmittance and the signal spectrum results in a BER that can be measured at a receiver. The receiver can measure the BER and can then request that the transmitter begin dithering the optical signal. Dithering of the signal results in the signal being transmitted with a series of different signal reference frequencies. This has the effect of slightly shifting the location of the optical signal spectrum. As the dithering progresses, the optical signal spectrum may become more aligned with the filter transmittance. During this process, the receiver is able to observe a change in the BER. The receiver can notify the transmitter when the received signal has a minimal BER, or at least a BER below a threshold. In some embodiments, the receiver can also indicate to the transmitter a direction in which to dither the signal. The signal transmitted during the dithering process may be referred to as a dithered signal, and it may have a dithered signal reference frequency.

The technology as described herein may be applied in a similar manner to optical signal transmission with any number of carriers in one optical channel. Dithering of the multiple carriers may be applied orthogonally in order to avoid interference between the carriers.

It should be understood, that methods as described herein may be implemented fully or partially using a non-transitory computer readable medium with computer executable instructions stored thereon that. When executed by a processor, the computer executable instructions cause the processor to perform the methods fully or partially.

It is to be understood that the operations and functionality of the disclosed methods and apparatuses may be achieved by hardware-based, software-based, firmware-based elements and/or combinations thereof. Such operational alternatives do not, in any way, limit the scope of the present disclosure.

It will also be understood that, although the inventive concepts and principles presented herein have been described with reference to specific features, structures, and embodiments, it is clear that various modifications and combinations may be made without departing from the such disclosures. The specification and drawings are, accordingly, to be regarded simply as an illustration of the inventive concepts and principles as defined by the appended claims, and are contemplated to cover any and all modifications, variations, combinations or equivalents that fall within the scope of the present disclosure.

What is claimed is:

1. A method for controlling an optical channel signal in an optical network having an optical filter, the optical channel signal having an optical channel spectrum and an original signal reference frequency, the method comprising:
   transmitting, through the optical filter, a dithered optical channel signal obtained by alternately detuning of the optical channel spectrum with regards to frequency, a dithered signal reference frequency of the dithered optical channel signal being detuned to a first signal reference frequency during first time periods and to a second signal reference frequency during second time periods, the second signal reference frequency being higher than the first signal reference frequency;
   receiving a request to shift the optical channel spectrum of the optical channel signal with regards to frequency, the request comprising an indication of a direction of shifting of the optical channel spectrum with regards to frequency; and
   shifting the optical channel spectrum with regards to frequency based on the received request in order to reduce a relative frequency offset between an optical filter transmittance of the optical filter and the optical channel spectrum.

2. The method of claim 1, wherein the request to shift the optical channel spectrum of the optical channel signal comprises a request to increase the original signal reference frequency of the optical channel spectrum or a request to decrease the original signal reference frequency of the optical channel spectrum.

3. The method of claim 1, wherein the detuning of the optical channel spectrum with regards to frequency is performed digitally by a digital signal processor and shifting the optical channel spectrum with regards to frequency based on the received request is performed by a laser light source.

4. The method of claim 1, wherein the request to shift the optical channel spectrum further comprises a frequency adjustment step.

5. The method of claim 1, wherein
the optical channel signal is a first carrier of a dual-carrier optical signal, the dual-carrier optical signal comprising the first carrier and a second carrier;
the second carrier has a second optical channel spectrum; and
the method further comprises:
transmitting a second dithered carrier obtained from the second carrier by alternately detuning of the second optical channel spectrum with regards to frequency, the second dithered optical channel spectrum having a second dithered signal reference frequency being detuned to:
a third signal reference frequency during third time periods, and
a fourth signal reference frequency during fourth time periods, the fourth signal reference frequency being higher than the third signal reference frequency;
receiving a request to shift the second optical channel spectrum of the second carrier with regards to frequency, the request comprising an indication of a direction of shifting of the second optical channel spectrum with regards to frequency; and
shifting the second optical channel spectrum of the second carrier with regards to frequency based on the received request.

6. The method of claim 5, wherein the first carrier and the second carrier are dithered orthogonally.

7. An apparatus for an optical network having an optical filter, the apparatus comprising:
a laser light source configured to generate an optical channel signal having an optical channel spectrum; and
a processor configured to:
dither the optical channel spectrum with regards to frequency, a dithered signal reference frequency being detuned to:
a first signal reference frequency during first time periods, and
a second signal reference frequency during second time periods, the second signal reference frequency being higher than the first signal reference frequency;
receive an indication of a direction of shifting of the optical channel spectrum with regards to frequency, the indication being received after the optical channel spectrum dithered with regards to frequency has been transmitted through the optical filter; and
shift, by a frequency adjustment step, the optical channel spectrum with regards to frequency based on the indication in order to reduce a relative frequency offset between an optical filter transmittance of the optical filter and the optical channel spectrum.

8. A method for controlling optical network equipment in an optical network, the method comprising:
receiving a dithered optical channel signal, the dithered optical channel signal having a dithered signal reference frequency that is detuned to:
a first signal reference frequency during first time periods, and
a second signal reference frequency during second time periods, the second signal reference frequency being higher than the first signal reference frequency;

measuring and averaging a first bit error rate of the dithered optical channel signal during the first time periods and a second bit error rate of the dithered optical channel signal during the second time periods; and
transmitting a request to the optical network equipment to adjust operation of the optical network equipment based on a bit error rate difference between the second bit error rate and the first bit error rate.

9. The method of claim 8, wherein:
the optical network equipment is a transmitter, and
the request to adjust operation comprises an indication based on the bit error rate difference being positive or negative.

10. The method of claim 9, wherein:
the request to adjust operation further comprises a request to increase an original signal reference frequency, and
the request to increase the original signal reference frequency is transmitted in response to the bit error rate difference being negative.

11. The method of claim 9, wherein
the request to adjust operation further comprises a request to decrease an original signal reference frequency, and
the request to decrease the original signal reference frequency is transmitted in response to the bit error rate difference being positive.

12. The method of claim 8, wherein:
the dithered optical channel signal is a first dithered carrier of a dual-carrier optical signal and the bit error rate difference is a first carrier bit error rate difference;
the dual-carrier optical signal comprises the first dithered carrier and a second dithered carrier, the second dithered carrier having a second dithered signal reference frequency detuned to a third signal reference frequency during third time periods and a fourth signal reference frequency during fourth time periods; and
the method further comprises:
measuring and averaging a third bit error rate of the dithered optical channel signal during the third time periods;
measuring and averaging a fourth bit error rate of the dithered optical channel signal during the fourth time periods; and
transmitting a request to the optical network equipment to adjust operation of the optical network equipment based on:
the first carrier bit error rate difference;
a second carrier bit error rate difference between the fourth bit error rate and the third bit error rate; and
a difference between the third bit error rate and the first bit error rate.

13. The method of claim 12, wherein the first dithered carrier and the second dithered carrier are dithered orthogonally.

14. The method of claim 8, wherein the dithered optical channel signal is received after propagating through an optical filter.

15. The method of claim 14, wherein:
the optical network equipment is the optical filter, and
the request to adjust operation of the optical network equipment further comprises an indication of the bit error rate being positive or negative.

16. An apparatus for optical networks, the apparatus comprising:

a photodetector configured to receive a dithered optical channel signal, the dithered optical channel signal having a dithered signal reference frequency that is detuned to:
- a first signal reference frequency during first time periods, and
- a second signal reference frequency during second time periods, the second signal reference frequency being higher than the first signal reference frequency; and a processor configured to:
- determine an averaged first bit error rate during the first time periods and an averaged second bit error rate during the second time periods; and
- generate and transmit a request to optical network equipment to adjust operation of the optical network equipment based on a bit error rate difference between the second bit error rate and the first bit error rate.

17. The apparatus of claim 16, wherein the optical network equipment is a transmitter, and the request to adjust operation of the optical network equipment comprises a request to adjust an optical channel spectrum of the optical channel signal.

18. The apparatus of claim 17, wherein the request to adjust the optical channel spectrum comprises a request to increase an original signal reference frequency of the optical channel spectrum and the request to increase the original signal reference frequency is generated in response to the bit error rate difference being negative.

19. The apparatus of claim 17, wherein the request to adjust the optical channel spectrum comprises a request to decrease the original signal reference frequency of the optical channel spectrum, and the request to decrease the original signal reference frequency is generated in response to the bit error rate difference being positive.

20. The apparatus of claim 17, wherein the request to adjust the optical channel spectrum comprises an indication of the bit error rate difference being positive or negative.

21. The apparatus of claim 16, wherein the optical network equipment is an optical filter, and the request to adjust operation of the optical network equipment is based on the bit error rate difference being positive or negative.

22. The apparatus of claim 16, wherein:
the optical channel signal is a first carrier of a dual-carrier optical signal, the dithered optical channel signal is the first dithered carrier, and the bit error rate difference is the first carrier bit error rate difference;
the photodetector is further configured to receive the first dithered carrier and a second dithered carrier, the second dithered carrier having a dithered signal reference frequency that is detuned to a third signal reference frequency during third time periods and a fourth signal reference frequency during fourth time periods, the fourth signal reference frequency being higher than the third signal reference frequency; and
the processor is further configured to:
- determine an averaged third bit error rate during the third time periods and an averaged fourth bit error rate during the fourth time periods; and
- generate and transmit a request to the optical network equipment to adjust operation of the optical network equipment based on:
  - the first carrier bit error rate difference;
  - a second carrier bit error rate difference between the fourth bit error rate and the third bit error rate; and
  - a difference between the third bit error rate and the first bit error rate.

* * * * *